United States Patent [19]

Ohashi et al.

[11] Patent Number: 4,761,022
[45] Date of Patent: Aug. 2, 1988

[54] SUSPENSION CONTROLLER FOR IMPROVED TURNING

[75] Inventors: Kaoru Ohashi, Okazaki; Chiaki Hamada, Susono; Hiroshi Kawakami; Yutaka Hirano, both of Toyota; Zensaku Murakami, Susono, all of Japan

[73] Assignee: Toyota Jidosha Kabushiki Kaisha, Japan

[21] Appl. No.: 17,747

[22] Filed: Feb. 24, 1987

[30] Foreign Application Priority Data

Mar. 8, 1986 [JP] Japan ............................ 61-51214
Aug. 6, 1986 [JP] Japan ........................... 61-184873
Aug. 8, 1986 [JP] Japan ........................... 61-187335
Dec. 15, 1986 [JP] Japan ........................... 61-298539

[51] Int. Cl.⁴ ...................... B62D 9/02; B60G 17/08
[52] U.S. Cl. ................................. 280/772; 280/703; 280/707
[58] Field of Search ................ 280/772, 703, 707

[56] References Cited

U.S. PATENT DOCUMENTS 4,564,214 1/1986 Tokunaga et al. ............ 280/772
4,575,116 3/1986 Miyata ............................ 280/772
4,586,728 5/1986 Tokunaga et al. ............ 280/703

FOREIGN PATENT DOCUMENTS 0035330 9/1981 European Pat. Off. .
0193744 10/1986 European Pat. Off. .
182505 11/1982 Japan ............................... 280/772
96062 6/1984 Japan ............................... 280/772
60-46315 4/1985 Japan .
60-60023 4/1985 Japan .
60-113712 6/1985 Japan .
60-113714 6/1985 Japan .
60-191812 9/1985 Japan .
61-193907 8/1986 Japan .
61-193908 8/1986 Japan .
61-193909 8/1986 Japan .
61-193910 8/1986 Japan .
61-268509 11/1986 Japan .
WO84/02886 8/1984 World Int. Prop. O. .
8400014 8/1984 United Kingdom .

OTHER PUBLICATIONS

Patent Abstracts of Japan, vol. 9, No. 268 (M-424) (1991), 25th Oct. 1985; and JP-A-60 113 714 (NISSAN), 20-06-1985.

Primary Examiner—Kenneth R. Rice
Attorney, Agent, or Firm—Parkhurst & Oliff

[57] ABSTRACT

Provided is a so-called active suspension controller for a vehicle especially effective during turning. The controller comprises: an actuator provided between the body and every wheel of the vehicle; sensors for a turning condition of the vehicle, here the turning condition including a steering angle, vehicle speed, yaw rate and others; and a control apparatus responsive to the sensed turning condition for driving the actuators in order to control the allotment ratio between the front and the rear axles of the load shift between the right and the left wheels. The allotted load shift realizes stable turning under various circumstances.

15 Claims, 22 Drawing Sheets

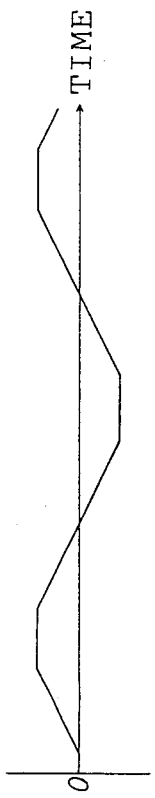
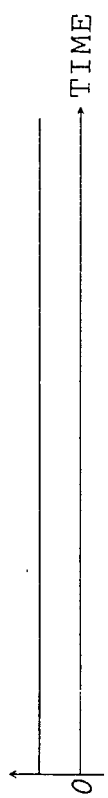
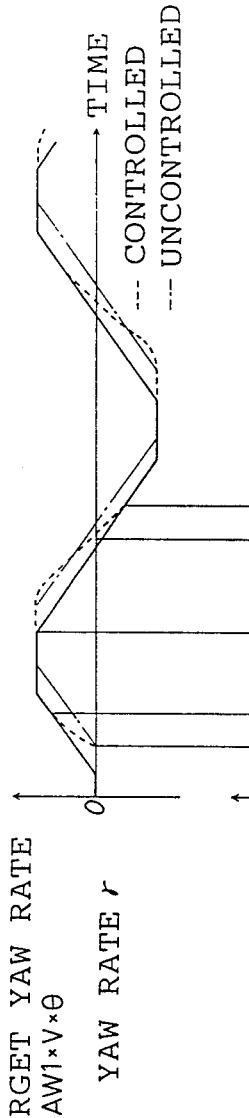
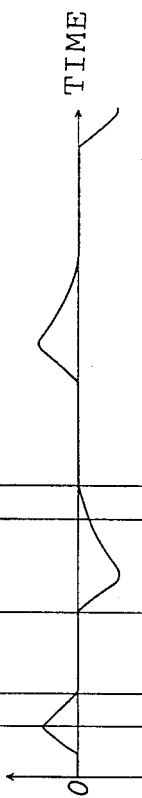
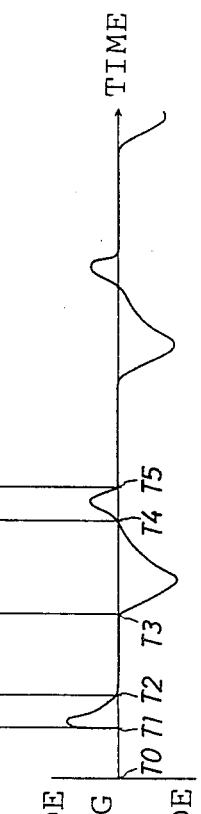
FIG. 8A  STEERING ANGLE θ
FIG. 8B  VEHICLE SPEED V
FIG. 8C  TARGET YAW RATE AW1×V×θ
YAW RATE r
FIG. 8D  YAW RATE ERROR AW1×V×θ−r
FIG. 8E  YAW RATE CORR. VALUE r×(AW1×V×θ−r)

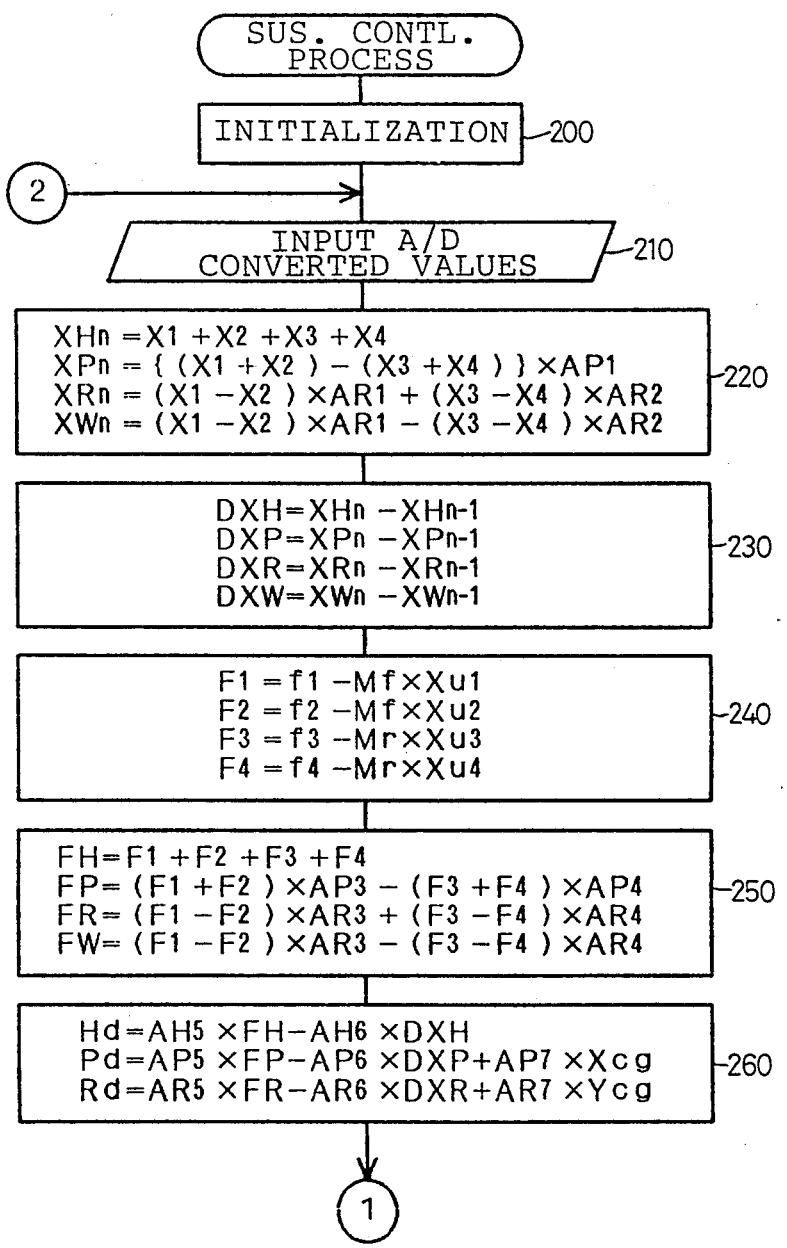

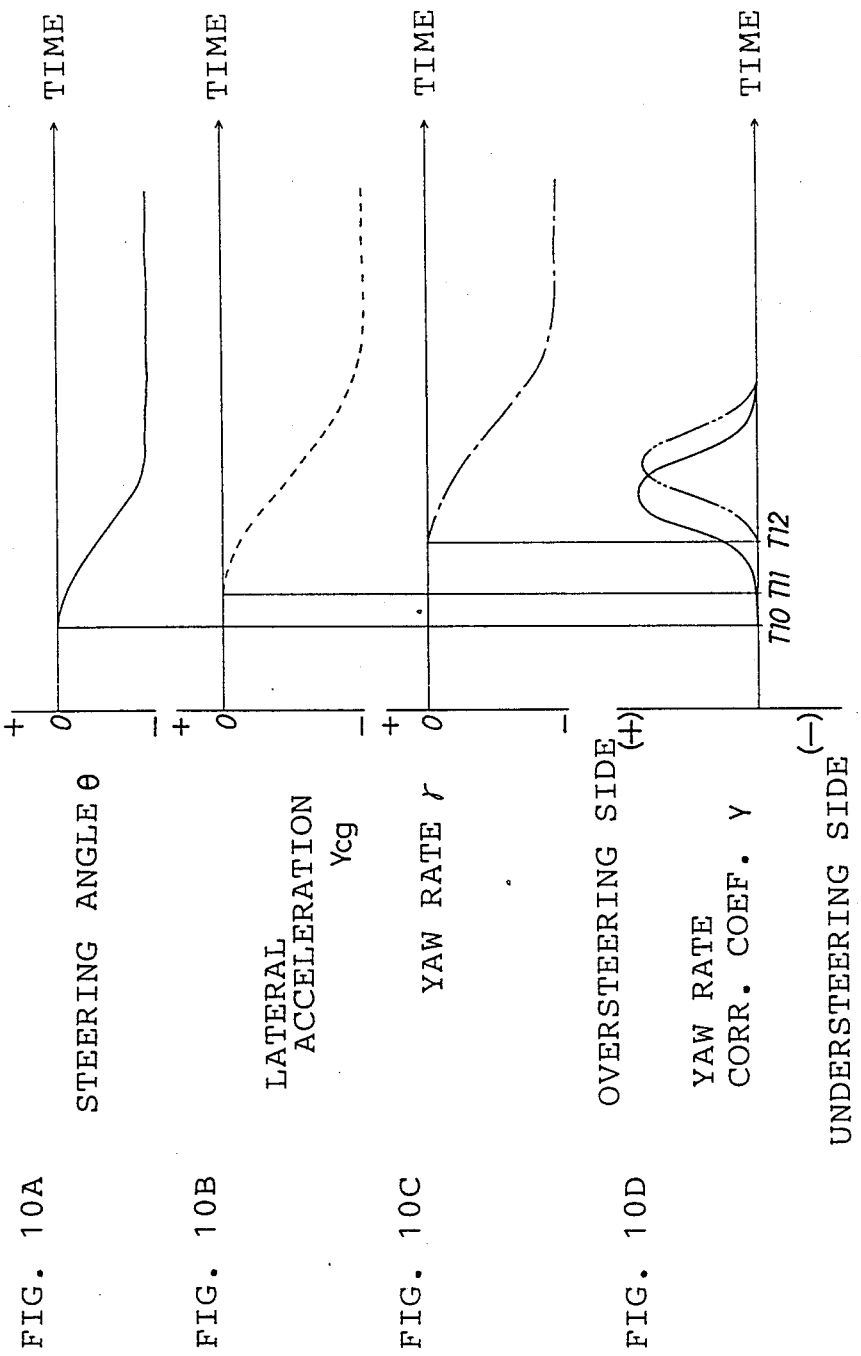

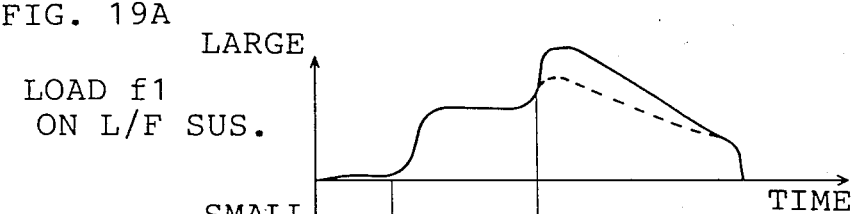
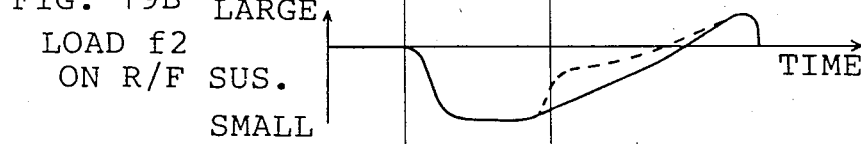
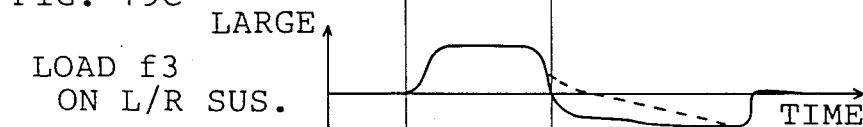
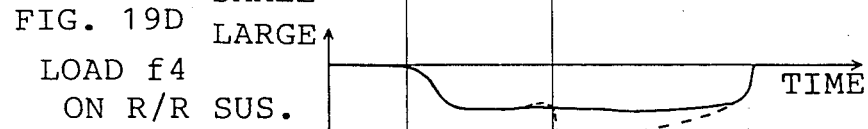

SUSPENSION CONTROLLER FOR IMPROVED TURNING

BACKGROUND OF THE INVENTION

1. Field of Application

The present invention relates to an active suspension controller especially effective in the turning of a vehicle.

2. Prior Art

So-called active suspension controllers for improving riding comfort and for stabilizing vehicle attitude are well-known these days, the control actuators of which are provided on the wheels of the vehicle. The controllers calculate the target displacement of every actuator based on the sensed load and displacement of the respective actuator, and drive the actuator to realize the target displacement. One example of such active suspension controllers is seen in the International Patent Publication No. WO 84/02886, in which the apparatus includes double-acting hydraulic actuators which enable controlled change in the actuator displacement, and a control system for outputting the necessary displacement change signal to those actuators depending on the sensed load and displacement of the actuators. The apparatus can thus stabilize the vehicle attitude, compensating turbulent forces exerted on the body of the vehicle. In turning, for example, the control system estimates a roll torque of the body from a sensed lateral acceleration and generates necessary control signals to activate the actuators for changing the load on every wheel. As a result, the load allotment for every wheel is rearranged according to the turning condition and the body attitude is stabilized and the ride comfort is maintained.

SUMMARY OF THE INVENTION

The traditional active suspension controllers have the following shortcomings. The amount of the shifted load from the right to the left wheels, or vice versa, is always set to be the same between the front axle and the rear axle by those controllers in turning. Therefore, the turning characteristic is kept constant throughout the turn regardless of the turning condition, including the vehicle speed. In general, an oversteering characteristic is preferred when starting to turn, neutralsteering during turning, and understeering when reversing the steering operation for better drivability. When an oversterring characteristic is kept throughout the turning movement, the driving stability deteriorates when the steering operation is reversed, because the yaw rate of the body changes rapidly. On the other hand, when an understeering characteristic is kept throughout the turning movement, the driving performance is deteriorated when starting to turn, because the turning action is retarded at the beginning. As the turning characteristic is slightly understeering in the normal production car setting, it has been difficult to precisely realize what the driver intends in starting to turn.

Therefore, it is an object of the present invention to improve drivability and stability especially during turning of a vehicle. Another object of the invention is to maintain such good drivability and stability in various turning conditions. The turning condition includes vehicle speed, yaw rate of the body, steering angle, lateral and longitudinal acceleration of the body, and the combination of them. Still another object is to compensate the effect of uneven load distribution on the turning characteristic. Here, the load distribution is determined when the vehicle is not turning.

These and other objects are achieved by a controller for suspensions of a vehicle, whose principle structure is shown in FIG. 1, including an actuator M1 provided between the body and every wheel of the vehicle, means M2 for sensing a turning condition of the vehicle, the turning condition including a steering angle, and control means M3 responsive to the sensed turning condition for driving the actuators in order to control the allotment ratio between the front and the rear axles of the load shifted between the right and the left wheels.

The actuator M1 can change the load exerted from the body to every wheel. It is realized by, for example, a hydraulic actuator which includes a piston and a cylinder, a pressure source and a servo valve which can connect and shut off the pressure source and the actuator. In this case, the piston displacement changes the load on the corresponding wheel.

The turning condition sensing means M2 sense at least the steering angle of the vehicle. They may further sense the vehicle speed and yaw rate of the body. A lateral acceleration sensor of the body, longitudinal acceleration sensor, or load sensor for detecting the load exerted by the body on every wheel and the combination of any of the prescribed sensors can be included in the sensing means M2. Specifically, the acceleration sensor may be a strain gauge type or a servo accelometer. The yaw rate sensor may be a rate gyrometer, an vibration gyrometer or a optical fiber gyrometer. The steering angle sensor may be a well-known rotary encoder that is capable of detecting the origin.

The control means M3 may, in a case, control the actuators M1 so that the front axle is allotted with a smaller load shift when the vehicle is sensed to begin turning, and the rear axle is allotted with a smaller load shift when the steering operation is reversed. In this case, the responsiveness of the steering operation is improved and the stability of the body attitude is maintained. This will lead to a good riding comfort while turning.

Another exemplified operation of the control means M3 is that it control the allotment ratio so that the sensed turning condition approaches a target condition. The target condition may be expressed by a target yaw rate of the body calculated from the sensed steering angle and the sensed vehicle speed.

Another target condition can be set on the basis of a criterion value, where the criterion value is a product of the sensed yaw rate and an error of the sensed yaw rate from a target yaw rate which is calculated from the sensed steering angle and the sensed vehicle speed. Use of this criterion value can promptly detect the start and the reversal of the steering operation.

The criterion value is alternatively a product of the sensed lateral acceleration and an error of the sensed yaw rate from a target yaw rate which is calculated from the sensed steering angle and the sensed vehicle speed. Another criterion value is determined by a product of the sensed yaw rate and an error of the sensed yaw rate from a target yaw rate which is calculated from an understeer setting coefficient derived from the sensed steering angle, the sensed vehicle speed, a square of the sensed vehicle speed and characteristics of the vehicle. In this case, the vehicle speed is more effectively reflected to the criterion value and the steering characteristic is adequately determined with every vehicle speed. The maneuverability can be improved at low speed and the stability is kept at high speed, while the driver's feel of the steering is maintained at both speeds.

In any of the above cases, when the calculated target yaw rate is greater than a preset limit yaw rate, the target yaw rate can be determined to be the preset limit yaw rate, which can be determined by a division of the tolerable lateral acceleration by the sensed vehicle speed. The tolerable lateral acceleration is a function of the dynamic friction coefficient between the wheel and the road surface. This limit setting prevents so-called wheel lift or a wheel spin.

Another use of the control means M3 is to compensate the undesirable turning characteristic due to uneven load distribution of the vehicle. When two people ride on the front seats leaving the rear seats vacant, the load distribution at the front axle becomes larger than at the rear axle. In such cases, the turning characteristic tend to be affected by the load distribution. The control means M3 thus compensates the deleterious effect by adequately allotting the load shift between the front and the rear axles during turning: the rear axle is allotted a larger load shift when the load distribution at the front axle is greater than at the rear axle; and the front axle is allotted a larger load shift when the load distribution at the rear axle is greater than at the front axle.

As is well known, when the vehicle is accelerated or decelerated during turning, the turning characteristic changes. The control means M3 of this invention can compensate for these changes as well. The front axle is allotted with a larger load shift when the vehicle is decelerated, while the rear axle is allotted with a larger load shift when the vehicle is accelerated.

The control means M3 may be embodied by a logic circuit constructed by discrete electronic elements, or they may be embodied by a microcomputer including a CPU, a ROM, a RAM and the peripheral chips with a set of processing programs implemented with the above procedures.

With the suspension controller as described above, the amount of the load shift between the right and the left, or the inner and outer, wheels are allotted differently between the front and the rear axles during turning. The action is explained as follows.

The cornering power, or the cornering force divided by the slip angle, of a wheel has a non-linear relationship with the load exerted from the body to the wheel, as shown in FIG. 2. When the amount of the load shift between the right and the left wheels is small, as shown by a in FIG. 2, the overall cornering power is a sum of CP2I and CP2O. On the other hand, when the amount of the load shift between the right and the left wheels is large, as shown by b, the overall cornering power is a sum of CP1I and CP1O. As the relation curve is upward convex, the sums have a relationship $$CP1I + CP1O < CP2I + CP2O \quad (1).$$

The inequality (1) teaches that the overall cornering power is greater when the load shift is smaller.

On the other hand, the turning characteristic of a vehicle is determined by $$CR \cdot LR - CF \cdot LF \quad (2),$$

where CR is a cornering power of the rear wheels, LR is the distance between the rear axle and the body gravity center, CF is a cornering power of the front wheels, and LF is the distance between the front axle and the body gravity center. When the value of (2) is negative, the turning characteristic is oversteering; when 0, neutralsteering; and when positive, understeering. Thus, when the front axle is allotted a smaller load shift in turning by the present suspension controller, the cornering power of the front end increases, resulting in the oversteering characteristic. When, on the other hand, the rear axle is allotted with smaller load shift, the cornering power of the rear end increases, resulting in the understeering characteristic. The steering characteristic is thus deliberately controlled to achieve the prescribed objects.

BRIEF DESCRIPTION OF THE DRAWINGS

The invention may be best understood by reference to the following description of preferred embodiments and the drawings in which:

FIGS. 8A through 8E are timing charts for explaining actions of the first embodiment;

FIGS. 9A and 9B are flow charts integrally showing the control of the second embodiment of the invention;

FIG. 10A through 10D are timing charts for explaining actions of the second embodiment;

FIGS. 19A through 19F are timing charts for explaining actions of the fifth embodiment.

DETAIL DESCRIPTION OF PREFERRED EMBODIMENTS

Set forth below is the explanation of preferred embodiments of this invention based on the attached drawings.

Figure 1:
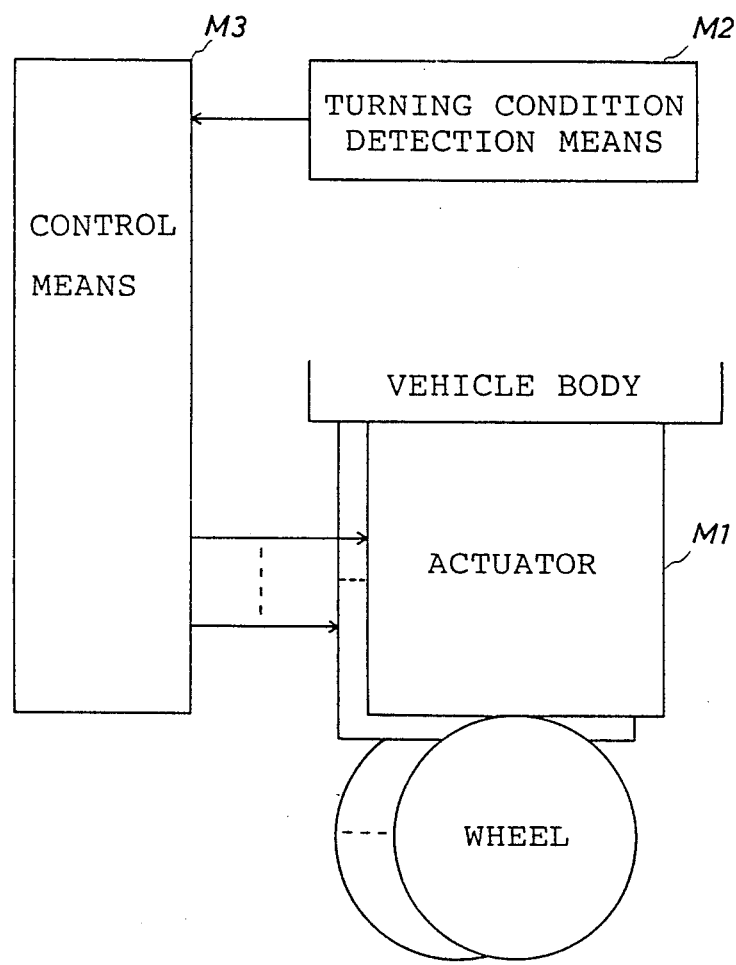
FIG. 1 shows a principle structure of the present invention.
Figure 2:
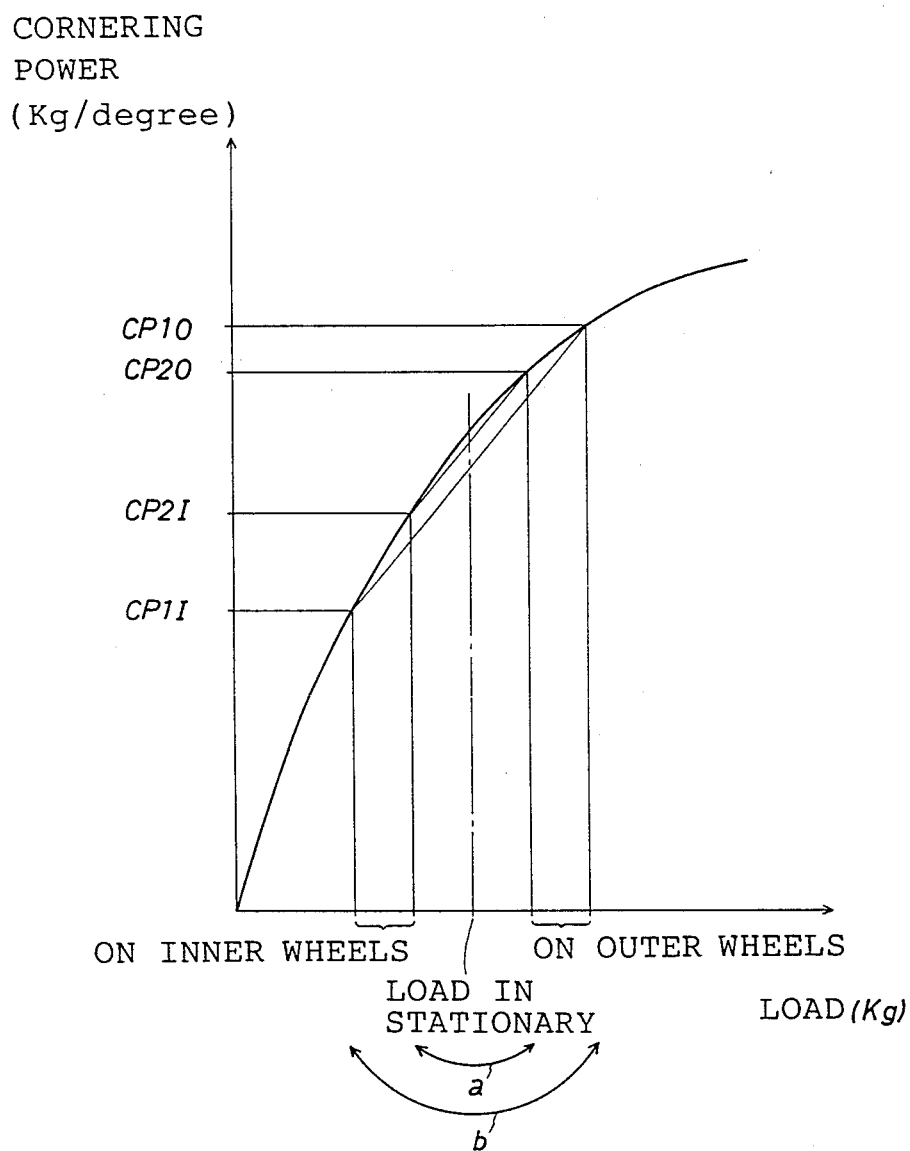
FIG. 2 is a graph showing a relationship between a load on a wheel and the cornering power of a wheel.
Figure 3:
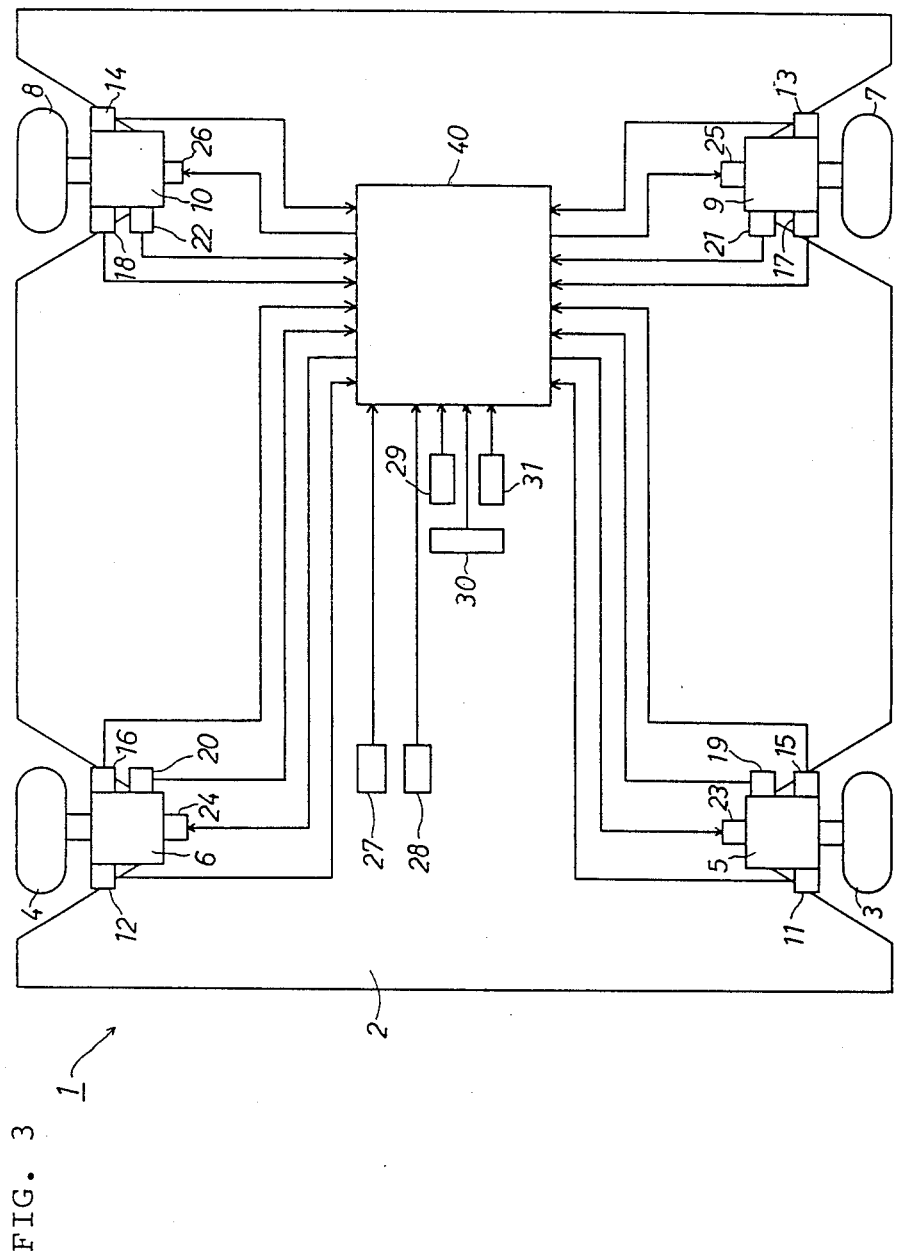
FIG. 3 is a system diagram of the first embodiment of the invention.

A system diagram of the first embodiment is shown in FIG. 3. As shown in the figure, a vehicle 1 is furnished with suspensions 5, 6, 9 and 10 between a vehicle body 2 and each of a left front wheel 3, a right front wheel 4, a left rear wheel 7 and right rear wheel 8. Moreover, the suspensions 5, 6, 9 and 10 are equipped with devices mentioned below: displacement converters 11, 12, 13 and 14, each of which outputs analog signals in proportion to the displacement of a stroke of the suspension; load sensors 15, 16, 17 and 18 having load cells for sensing the load between the vehicle body 2 and the wheels 3, 4, 7 and 8; unsprung mass acceleration sensors 19, 20, 21 and 22 provided to each suspension arm 20 as to detect the acceleration of the unsprung mass; and servo valves 23, 24, 25 and 26 for controlling the displacement of the suspension stroke. Furthermore, a vehicle speed sensor 27 for detecting the speed of the vehicle 1, a steering angle sensor 28 for detecting a polar angle of steering, a longitudinal acceleration sensor 29 which is installed in the proximity of the center of gravity, a lateral acceleration sensor 30, and a yaw rate sensor 31.

The signals outputted from each of the above-mentioned sensors are inputted into an electronic control unit (ECU) 40. The ECU 40 drives the servo valves 23, 24, 25 and 26 so as to control the suspensions 5, 6, 9 and 10.

Figure 4:
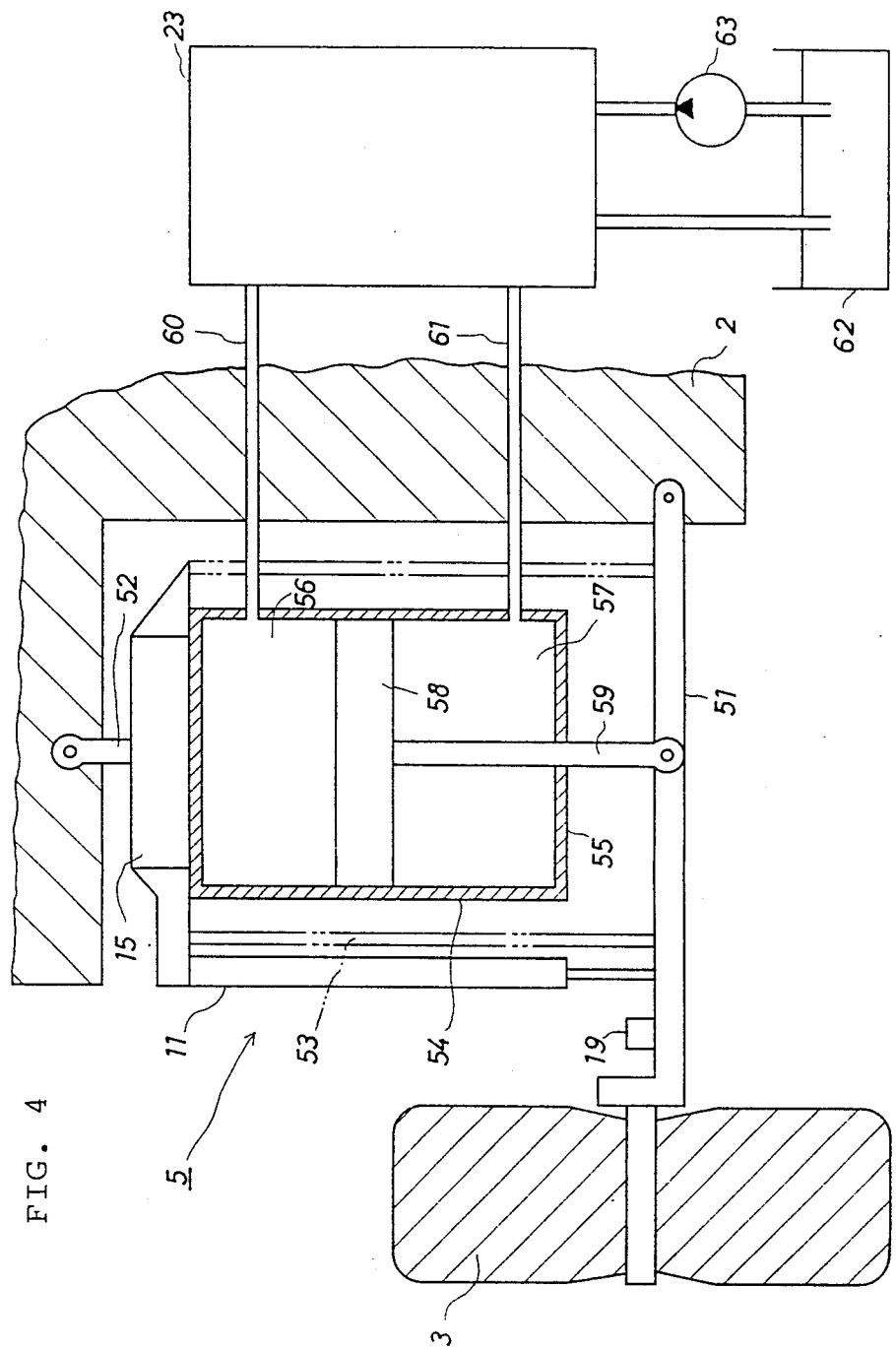
FIG. 4 is a detailed illustration of a suspension component 5 of the embodiment.

Since all of the suspensions 5, 6, 9 and 10 have the same constitution, the left front suspension 5 is explained as an example in this embodiment, with reference to FIG. 4. One end of the suspension arm 51 of the suspension 5 is pivoted to the body 2 and the other end supports the left front wheel 3. An oil hydraulic actuator 54 is housed within a coil spring 53. The coil spring 53 and the hydraulic actuator 54 are formed alongside between the lower end of a supporting member 52 whose upper end is pivoted to the body 2 and the suspension arm 51. The actuator 54 is substantially composed of a cylinder 55 and a piston 58 which partitions the cylinder 55 into an upper chamber 56 and a lower chamber 57. The lower end of a rod 59 extending from the piston 58 is pivoted to the suspension arm 51.

The load applied to the oil hydraulic actuator 54, namely, the load applied between the vehicle body 2 and the left front wheel 3 is detected by the left front wheel load sensor 15 including a load cell installed in the supporting member 52. The displacement of the piston 58 is measured by the displacement converter 11 for the left front wheel. One end of the converter 11 is connected to the suspension arm 51 and the other end is fixed to the supporting member 52. Moreover, the unsprung mass acceleration is detected by an unsprung mass acceleration sensor 19 for the left front wheel, which is attached in the proximity of one end of the suspension arm 51 for supporting the left front wheel 3.

Each of the upper chamber 56 and the lower chamber 57 of the oil hydraulic actuator 54 is connected to the electromagnetic servo valve 23 for the left front wheel via paths 60 and 61. The servo valve 23 constructs an oil hydraulic circuit which is composed of a reservoir 62 and a pump 63. A high-pressur work oil which is pressurized by the pump 63 is always supplied to the left front wheel servo valve 23. The work oil passes through a variable orifice formed in the servo valve 23 and returns to the reservoir 62. Since the variable orifice controls the flow rate of the work oil, the pressure difference between the upper chamber 56 and the lower chamber 57 of the oil hydraulic actuator 54 can be intentionally controlled. When the left front wheel servo valve 23 is driven by the ECU 40, the piston 58 of the actuator 54 moves due to the pressure difference between the upper chamber 56 and the lower chamber 57, thereby the load applied between the vehicle body 2 and the left front wheel 3 can be controlled.

Figure 5:
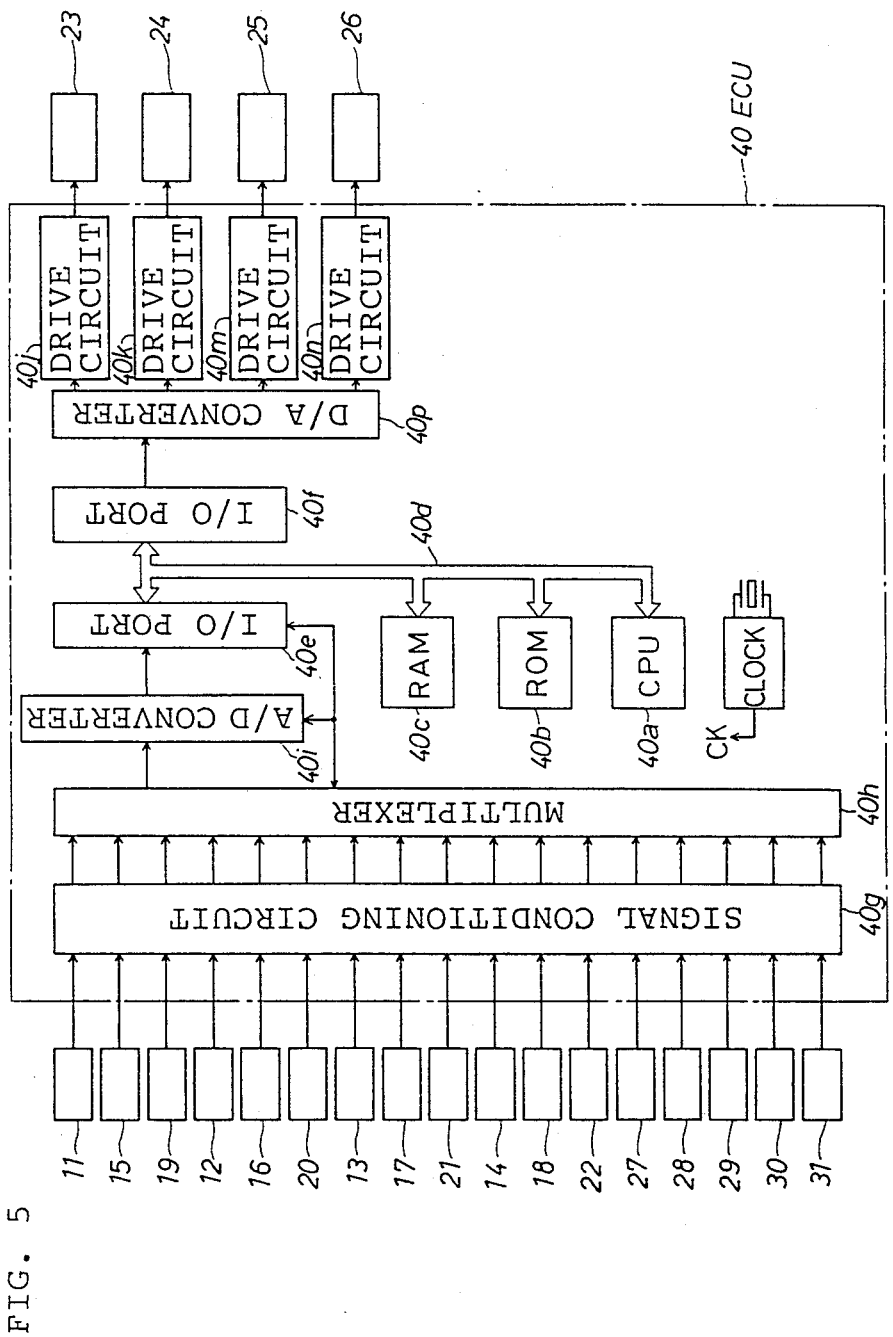
FIG. 5 is a block diagram of the electronic control unit (ECU) 40 and thye peripheral units.

The constitution of the ECU 40 is hereinunder described with reference to FIG. 5. The ECU 40 is a logic circuit substantially composed of a CPU 40a, a ROM 40b and a RAM 40c. Each of these elements is interconnected to input/output (I/O) ports 40e and 40f via a common bus 40d.

The ECU 40 includes a signal conditioning circuit 40g being equipped with a buffer or a filter for signals detected by various sensors, a multiplexer 40h for selectively inputting various signals, and an A/D converter 40i for converting an analog signal into a digital signal. The detected signals are inputted into the CPU 40a via the I/O port 40e.

The ECU 40 further includes drive circuits 40j, 40k, 40m and 40n for the servo valves 23, 24, 25 and 26, and also includes a D/A converter 40p for converting a digital signal to an analog signal. The control signal outputted from the CPU 40a is transmitted to each of the above-mentioned drive circuits 40j, 40k, 40m and 40n via the I/O port 40f and the D/A converter 40p.

Figure 6:
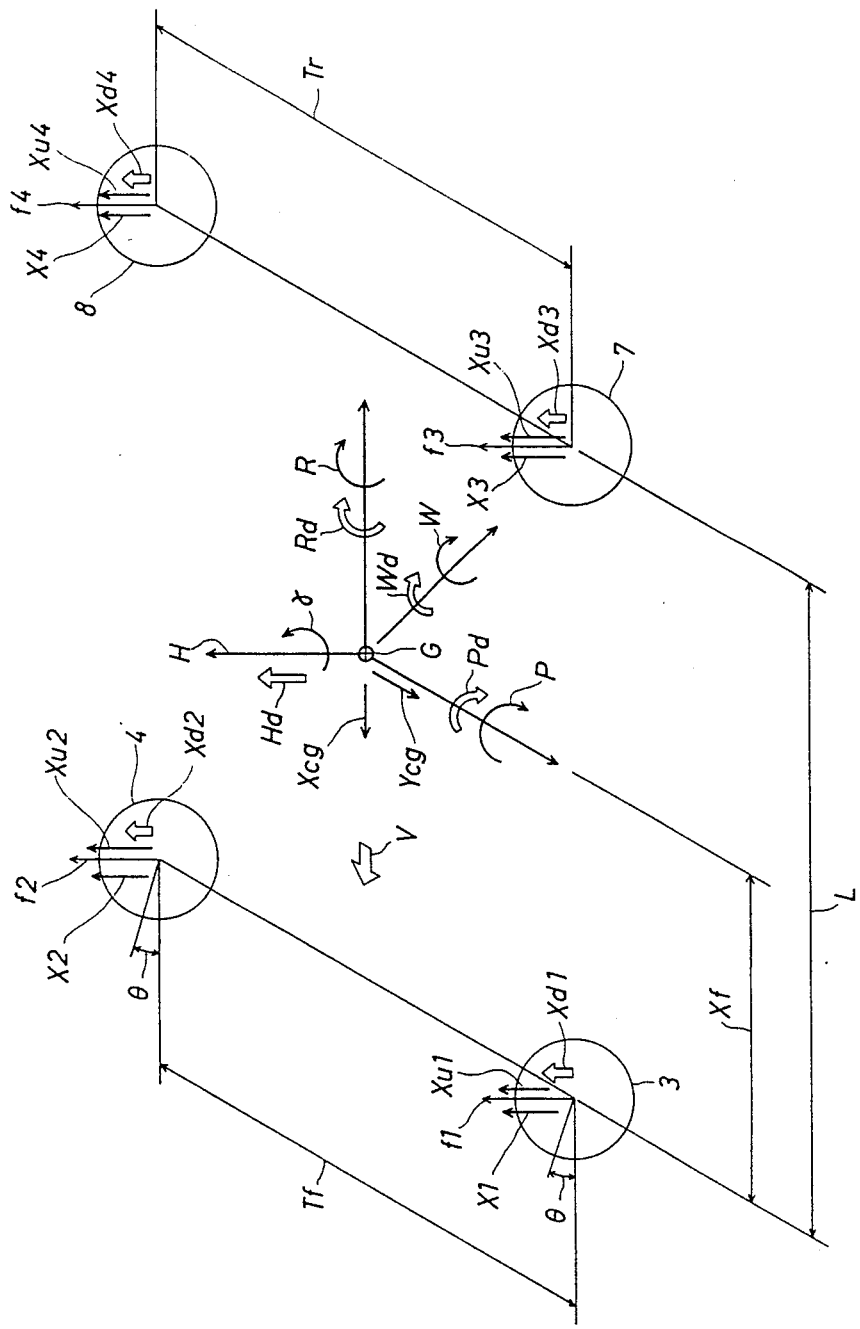
FIG. 6 is an illustration for explaining various forces and moments on the vehicle body.

The relationship among various data (values) utilized in the suspension control in the first embodiment is set forth below with reference to FIG. 6.

The displacement X1, X2, X3 and X4 of the suspension stroke for each of the wheels 3, 4, 7 and 8, the load f1, f2, f3 and f4, and the unsprung mass acceleration Xu1, Xu2, Xu3 and Xu4 are respectively detected by the displacement converters 11, 12, 13 and 14, by load sensors 15, 16, 17 and 18, and by the unsprung mass acceleration sensors 19, 20, 21 and 22. The longitudinal acceleration Xcg of the center of gravity G of the vehicle body, the lateral acceleration Ycg and the yaw rate (yaw angular speed) $\gamma$ are respectively detected by the longitudinal acceleration sensor 29, the lateral acceleration sensor 30 and the yaw rate sensor 31. Moreover, the vehicle speed V and the steering angle $\theta$ are respectively detected by the vehicle speed sensor 27 and the steering angle sensor 28.

Based on the above-mentioned various variables, movement patterns of the suspensions of the wheels 3, 4, 7 and 8 are first converted into four types of movement modes at the center of gravity G of the vehicle body. The four modes are as follows: heave, i.e., vertical vibration shown by an arrow H; pitch, i.e., the rotating vibration around the transverse axis through the center of gravity G shown by an arrow P; roll, i.e., rotating vibration around the longitudinal axis through the center of gravity G shown by an arrow R; and warp, i.e., twisting vibration in relation to the diagonal axis through the center of gravity G of the vehicle shown by an arrow W.

Next, the target displacements at the center of gravity G responsive to each of the above-mentioned four movement modes are calculated. Namely, target displacements of heave Hd, pitch Pd, roll Rd and warp Wd at the center of gravity G are calculated. Then, these target displacements Hd, Pd, Rd and Wd are converted into the target susension stroke displacements Xd1, Xd2, Xd3 and Xd4 for each of the wheels 3, 4, 7 and 8. The ECU 40 controls the servo valves so that each suspension stroke displacement equals the above-mentioned target value. In FIG. 6, wheel base, front wheel tread rear wheel tread and the distance between the front axle and the center of gravity G are respectively shown by L, Tf, Tr and Xf.

Figure 7A:
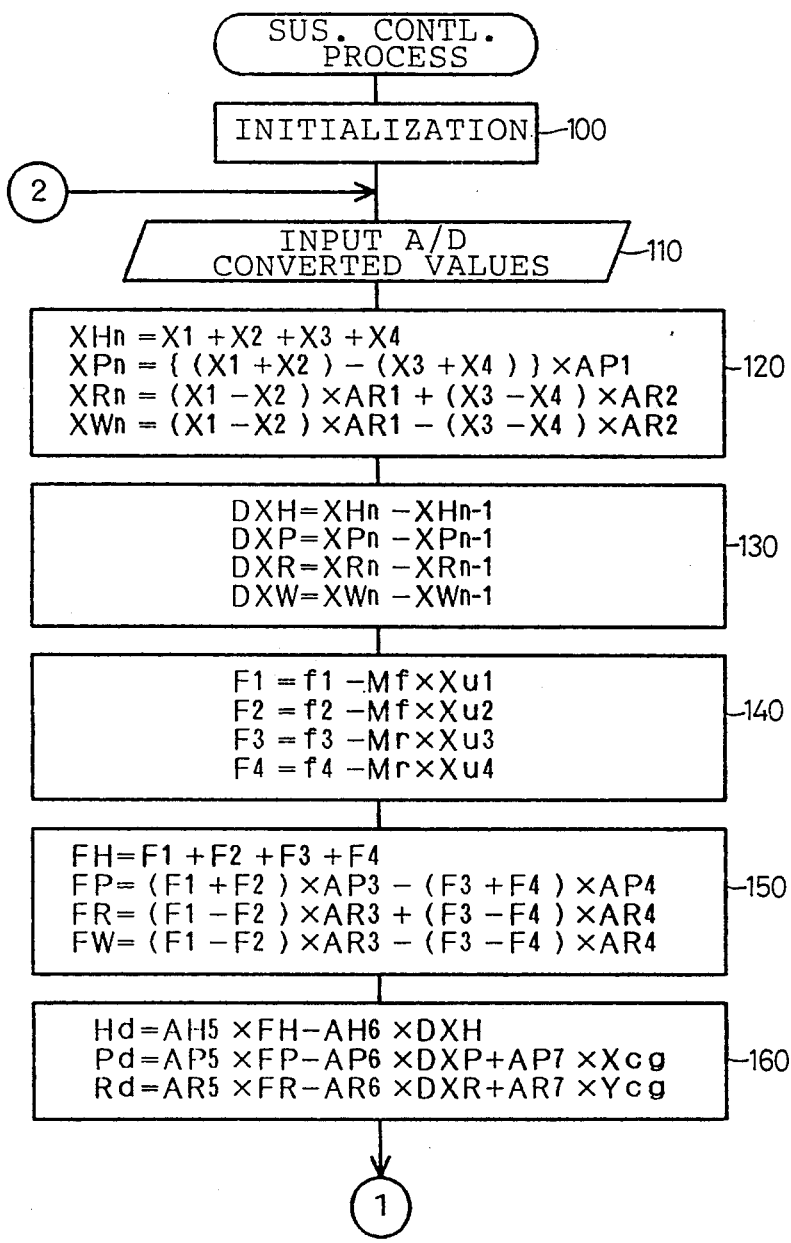
FIGS. 7A and 7B are flow charts integrally showing the control of the first embodiment.
Figure 7B:
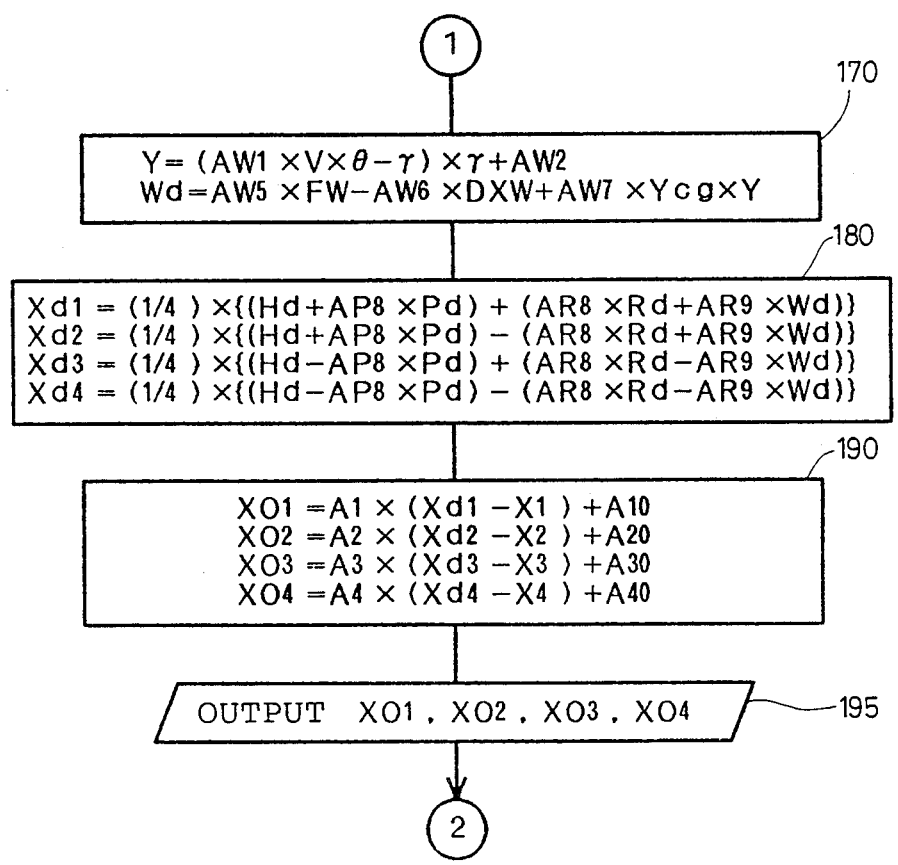

The suspension control process executed by the ECU 40 is hereinunder described in reference with the flow charts of FIGS. 7A and 7B. This process is repeatedly executed every predetermined time interval after the ECU 40 is actuated.

At step 100 of FIG. 7A, initialization is executed, namely, the entry of the RAM 40c is cleared and the initial values are set. At step 110, analog signals from various sensors are converted into digital signals which are assigned to respective variables. The converted signals, i.e., the suspension stroke displacements X1, X2, X3 and X4; the load f1, f2, f3 and f4; the unsprung mass acceleration Xu1, Xu2, Xu3 and Xu4; the longitudinal acceleration Xcg, the lateral acceleration Ycg; the vehicle speed V; the steering angle $\theta$; and the yaw rate $\gamma$ are inputted at step 110.

At the subsequent step 120, the present values of the heave displacement XHn, the pitch displacement XPn, the roll displacement XRn and the warp displacement XWn at G are calculated based on the detected suspension stroke displacement X1, X2, X3 and X4 in accordance with the following formulas (3) through (6).

$$XHn = X1 + X2 + X3 + X4 \tag{3}$$

$$XPn = \{(X1+X2) = (X3+X4)\} \cdot AP1 \tag{4}$$

$$XRn = (X1=X2)\cdot AR1 + (X3-X4)\cdot AR2 \tag{5}$$

$$XWn = (X1=X2)\cdot AR1 - (X3-X4)\cdot AR2 \tag{6}$$

where
AP1 = 1/L
AR1 = (Xf/L)·(1/Tf)
AR2 = {(L−Xf)/L}·(1/Tr).

At step 130, the heave speed DXH, the pitch speed DXP, the roll speed DXR and the warp speed DXW are calculated based on the present displacement (n) and the previous displacement (n−1) in accordance with the following formulas (7) through (10).

$$DXH = XHn - XHn-1 \tag{7}$$

$$DXP = XPn - XPn-1 \tag{8}$$

$$DXR = XRn - XRn-1 \tag{9}$$

$$DXW = XWn - XWn-1 \tag{10}$$

At step 140, the load F1 between the left front wheel 3 and the vehicle body 2, the load F2 between the right front wheel 4 and the body 2, the load F3 between the left rear wheel 7 and the body 2, and the load F4 between right rear wheel 8 and the body 2 are all calculated from the following formulas (11) through (14).

$$F1 = f1 - Mf\cdot Xu1 \tag{11}$$

$$F2 = f2 - Mf\cdot Xu2 \tag{12}$$

$$F3 = f3 - Mr\cdot Xu3 \tag{13}$$

$$F4 = f4 - Mr\cdot Xu4 \tag{14}$$

In the above formulas, the mass Mf is obtained by subtracting a predetermined certain mass mf from the actual front unsprung mass Mfd. In the same way, the mass Mr is obtained by subtracting a predetermined certain mass mr from the actual rear unsprung mass Mrd. Here, the masses mf and mr are introduced in order to assume or simulate any desired unsprung mass. These masses are determined by experiments so that the vehicle is assigned with desired suspension characteristics.

At step 150, a heave load FH, a pitch torque FP, a roll torque FR and a warp torque FW in relation to the center of gravity G are calcualted by utilizing the above-calculated loads F1, F2, F3 and F4 in accordance with the following formulas (15) through (18).

$$H = F1 + F2 + F3 + F4 \tag{15}$$

$$FP = (F1+F2)\cdot AP3 - (F3+F4)\cdot AP4 \tag{16}$$

$$FR = (F1-F2)\cdot AR3 + (F3-F4)\cdot AR4 \tag{17}$$

$$FW = (F1-F2)\cdot AR3 - (F3-F4)\cdot AR4 \tag{18}$$

where
AP3 = Xf
AP4 = pi L − Xf
AR3 = Tf/2
AR4 = Tr/2.

At the subsequent step 160, the target displacements of heave Hd, pitch Pd and roll Rd in relation to the center of gravity are calculated in accordance with the following formulas (19) through (21) by utilizing the speeds DXH, DXP, DXR calculated at step 130, the load FH and the torques FP and FR calculated at step 150.

$$Hd = AH5\cdot FH - AH6\cdot DXH \tag{19}$$

$$Pd = AP5\cdot FP - AP6\cdot DXP + AP7\cdot Xcg \tag{20}$$

$$Rd = AR5\cdot FR - AR6\cdot DXR + AR7\cdot Ycg \tag{21}$$

In the above formulas,
AH5 = 1/KH
AH6 = CH/KH
AP5 = 1/KP
AP6 = CP/KP
AR5 = 1/KR
AR6 = CR/KR
KH: stiffness in the direction of heave H
CH: damping coefficient in the direction of heave H
KP: stiffness in relation to pitch P
CP: damping coefficient in relation to pitch P
KR: stiffness in relation to roll R
CR: damping coefficient in relation to roll R
AP7: longitudinal acceleration correcting coefficient
AR7: lateral acceleration correction coefficient.

Here, the stiffnesses KH, KP, KR and the damping coefficients CH, CP, CR are predetermined by a course of development experiments so that the vehicle has desired suspension characteristics.

The subsequent step 170 of FIG. 7B follows the procedure set forth below. First, a target yaw rate is determined by the vehicle speed V and the polar angle of steering $\theta$. Next, a yaw rate correction coefficient Y is calculated by multiplying the detected yaw rate $\gamma$ by the yaw rate error, i.e., the difference between the target yaw rate and the actually detected yaw rate $\gamma$. Then, the target warp Wd in relation to the center of gravity G is calculated by utilizing the warp speed DXW calculated at step 130, the warp torque FW calculated at step 150 and the yaw rate correction coefficient Y in accordance with the following formulas (22) and (23).

$$Y = (AW1 \cdot V \cdot \theta - \gamma) \cdot \gamma + AW2 \quad (22)$$

$$Wd = AW5 \cdot FW - AW6 \cdot DXW + AW7 \cdot Ycg \cdot Y \quad (23),$$

where
AW5 = 1/KW
AW6 = CW/KW
AW1: yaw rate gain
AW2: correction coefficient for load allotment between front and rear axles
KW: stiffness in relation to warp W
CW: damping coefficient in relation to warp W
AW7: warp correction coefficient.

The stiffness KW and the damping coefficient CW in relation to warp W are also values predetermined in a course of development experiments with the above described values KH, KP, KR, CH, CP and CR.

At step 180, target suspension stroke displacement Xd1, Xd2, Xd3 and Xd4 for the corresponding wheels 3, 4, 7 and 8 are calculated in the following formulas (24) through (27) by utilizing the target displacements Hd, Pd, Rd and Wd at G calculated at steps 160 and 170.

$$Xd1 = (\tfrac{1}{4}) \cdot \{(Hd + AP8 \cdot Pd) + (AR8 \cdot Rd + AR9 \cdot Wd)\} \quad (24)$$

$$Xd2 = (\tfrac{1}{4}) \cdot \{(Hd + AP8 \cdot Pd) - (AR8 \cdot Rd + AR9 \cdot Wd)\} \quad (25)$$

$$Xd3 = (\tfrac{1}{4}) \cdot \{(Hd - AP8 \cdot Pd) + (AR8 \cdot Rd - AR9 \cdot Wd)\} \quad (26)$$

$$Xd4 = (\tfrac{1}{4}) \cdot \{(Hd - AP8 \cdot Pd) - (AR8 \cdot Rd - AR9 \cdot Wd)\} \quad (27)$$

where,
AP8 = L = (1/AP1)
AR8 = (L·Tf)/Xf = (1/AR1)
AR9 = (L·Tr)/(L−Xf) = (1/AR2)

At step 190, the differences X01, X02, X03 and X04 between each of the above-calculated target displacements Xd1, Xd2, Xd3 and Xd4 and each of the currently detected displacements X1, X2, X3 and X4 are calculated based on the following formulas (28) through (31).

$$X01 = A1 \cdot (Xd1 - X1) + A10 \quad (28)$$

$$X02 = A2 \cdot (Xd2 - X2) + A20 \quad (29)$$

$$X03 = A3 \cdot (Xd3 - X3) + A30 \quad (30)$$

$$X04 = A4 \cdot (Xd4 - X4) + A40 \quad (31),$$

where the values A1, A2, A3 and A4 are gain constants determined by the responsiveness of the oil hydraulic actuators, and the values A10, A20, A30 and A40 are offset constants determined by the target standard vehicle height.

The process step then proceeds to step 195, where the voltages in response to each of the displacement errors X01, X02, X03 and X04 calculated at step 190 are outputted to each of the corresponding servo valves 23, 24, 25 and 26 of the suspensions 5, 6, 9 and 10. After step 195, the process step returns to step 110 of FIG. 7A. Thus, the present routine (steps 110 through 195) is repeatedly executed.

The timing charts of FIG. 8A through 8E show an example of the above-mentioned control routine. In these timing charts, the vehicle speed V is kept constant, and various values are shown by the lapse of time when the vehicle is slaloming with the same right and left steering angle.

Since the steering angle and the yaw rate are small during the time period from T0 to T1, it is determined that the vehicle is not under the turning condition and the allotments at the front and the rear axles of the shifting load between the left and the right wheels are set to be the same. As a result, the preset steering characteristic of the vehicle is maintained.

At the time point T1, the delay of the yaw rate of the vehicle from the target yaw rate becomes large. To cope with this, the inner/outer (right/left) shift load between the front wheels is set to be smaller than that within the rear wheels so that the cornering power of the front wheels is increased. Thus, the preset steering characteristic is changed to the oversteering side as shown in FIG. 8E. As a result, the responsiveness to the operational steering angle $\theta$ is improved and the yaw rate rapidly approaches to the target yaw rate as shown by a broken line in FIG. 8E. At the time point T2, the delay of the yaw rate is corrected and the actual yaw rate becomes equal to the target yaw rate. Then, the right/left shift load is equally shared between the front and the rear so as to restore the turning performance from the oversteering side to the preset steering state. If the turning performance of the vehicle is not changed, the delay of the yaw rate occurs as shown by a dashed line in FIG. 8C, which results in deteriorating the turning performance of the vehicle.

At the time point T3, the wheels are steered in the opposite direction. At this time, the inner/outer shift load between the rear wheels is set to be smaller than that within the front wheels so as to increase the cornering power of the rear wheels. Thus, the turning performance of the vehicle is altered from the preset steering state to the understeering side. As a result, the vehicle is prevented from preceding the steering operation, namely, overturning or spinning is prevented. Accordingly, well-balanced turning can be realized. If the turning performance is not altered to the understeering side, the advance of the yaw rate occurs as shown by a dashed line in FIG. 8C, thereby the stability of the vehicle deteriorates.

At the time point T4 halfway through the stable turning, the right/left shift load is again equally shared between the front and the rear so as to restore the turning performance in the understeering side to the preset steering state. After this, the inner/outer shift load within the front wheels is set to be smaller than that within the rear wheels, and the turning performance is altered to the oversteering side. As a result, at the time point T5, the actual yaw rate becomes equal to the target yaw rate. At the same time T5, the right/left shift load is again equally shared between the front wheels and the rear wheels so as to restore the turning performance from the oversteering side to the preset steering state. The alteration of the turning performance is repeatedly executed by controlling the front/rear allotment ratio of the inner/outer shift load in response to the change of the steering angle.

In the first embodiment, the suspensions 5, 6, 9 and 10 correspond to the actuator M1, and the speed sensor 21, the steering angle sensor 28 and the yaw rate sensor 31 correspond to the turning condition detection means M2. Moreover, the ECU 40 and the control process steps 160, 170, 180, 190 and 195 executed by the ECU 40 correspond to the control means M3.

The outline of the operation of the first embodiment is repeated as follows: (1) the target displacements Hd, Pd, Rd and Wd of four movement modes, heave, pitch, roll and warp, at the center of gravity G is calculated under the condition that the stiffness in four directions and the damping coefficient of the vehicle are previously set; (2) the calculated four values are converted into the target displacement Xd1, Xd2, Xd3 and Xd4 of the suspensions 5, 6, 9 and 10; (3) the yaw rate correction coefficient Y in response to the turning condition is calculated by multiplying the yaw rate error by the actual yaw rate so that the yaw rate approaches (or becomes equal to) to the target yaw rate which is calculated based on the vehicle speed V and the steering angle $\theta$; (4) the target warp Wd is calculated based on the above-calculated yaw rate correction coefficient Y.

According to the first embodiment, the inner/outer shift load within the front wheels becomes smaller than that within the rear wheels at the beginning of steering, while the allotment ratio of the front wheels is larger than that of the rear wheels when the wheels are steered in the counter direction. The turning performance is altered from the preset steering state to the oversteering side at the beginning of steering. On the other hand, when the wheels are steered in the counter direction, the turning performance is altered to the understeering side and then restored to the preset steering state. As a result, at the beginning of steering, sharp turning as the driver desires is realized, and a stable steering condition can be maintained when the wheels are steered in the opposite direction. Thus, the turning performance is preferably changed in accordance with the steering condition.

Since the turning performance of the vehicle varies in response to the steering angle, a complicated mechanism such as four-wheel-steering control is not needed. Namely, the effect obtained by the suspension control for altering the front/rear allotment ratio of the inner/outer shift load is comparable to the effect by four-wheel-steering control.

For the calculation of the yaw rate correction coefficient Y, the yaw rate correction value obtained by multiplying the yaw rate by the yaw rate error is used. The turning performance of the vehicle therefore smoothly changes as follows in response to the steering angle:

oversteering→preset
steering→understeering→preset steering

As a result, the accuracy for controlling the vehicle during steering is increased, thereby maneuverability and stability of the vehicle can be improved.

Since the target displacement of the suspension stroke is calculated based on four movement modes, i.e., heave, pitch, roll and warp, especially considering warp, the degree of freedom in the suspension control is increased and stable vehicle attitude can be obtained.

Moreover, the so-called active control is realized so as to restrain the change of the vehicle attitude and to improve the responsiveness of turning. Thus, maneuverability and stability of the vehicle can be improved and the ride remains comfortable.

Next, the second embodiment of the present invention is described in detail in reference with FIGS. 9A, 9B, 10A, 10B, 10C and 10D.

The important difference between the first embodiment and the second embodiment is the term in the calculation of the yaw rate correction coefficient Y. In the second embodiment, the yaw rate correction coefficient Y is calculated by multiplying the yaw rate error by the lateral acceleration Ycg, while the yaw rate is utilized instead of the lateral acceleration Ycg in the first embodiment. Since the systematic constitution and some values used in the suspension control of the first embodiment are common to the second embodiment, these common parts are denoted by the same numbers and symbols as used in the first embodiment and the explanation is also referred to the first embodiment.

Figure 9B:
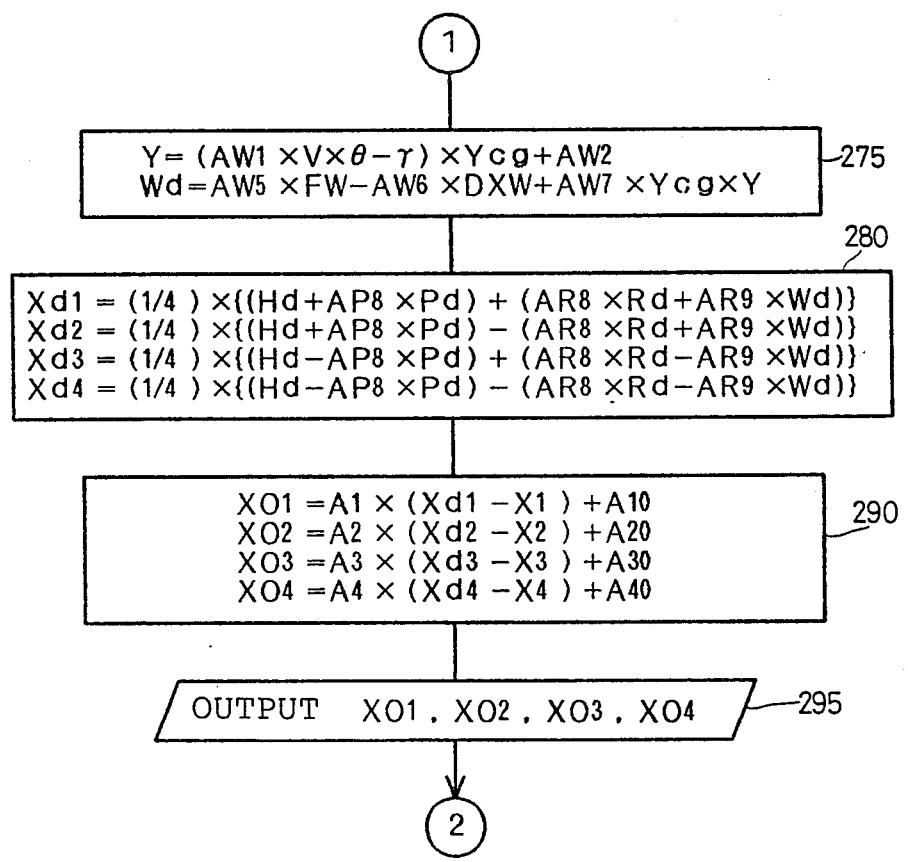

Set forth below is the explanation of the suspension control process routine of the second embodiment based on the flow charts of FIGS. 9A and 9B. In these flow charts, the process steps which are common to the first embodiment are numbered by utilizing the last two digits of the corresponding steps of the first embodiment. The present suspension control process routine is repeatedly executed at every predetermined time interval after the ECU 40 is actuated.

First of all, initialization is executed at step 200, and the process step proceeds to step 210 where the signals detected by various sensors are inputted. At the subsequent step 220, current displacements of heave XHn, pitch XPn, roll XRn and warp XWn at G are calculated. At step 230, a heave speed DXH, a pitch speed DXP, a roll speed DXR and a warp speed DXW are calculated, and moreover, loads F1, F2, F3 and F4 are calculated at step 240. At the following step 250, a heave load FH, a pitch torque FP, a roll torque FR and a warp torque FW at G are calculated. Furthermore, target displacements of heave Hd, pitch Pd and roll Rd are calculated at step 260.

Next, a target yaw rate is calculated from the vehicle speed V and the steering angle $\theta$. By multiplying the yaw rate error ( i.e., the difference between the target yaw rate) and the actual yaw rate $\gamma$ by the lateral acceleration Ycg, the yaw rate correction coefficient Y is calculated in accordance with the following formula (32).

$$Y = (AW1 \cdot V \cdot \theta - \gamma) \cdot Ycg + AW2 \tag{32}$$

By utilizing the above-calculated coefficient Y, a warp speed DXW and a warp torque FW, the target warp Wd at the center of gravity G is calculated at step 275.

At the subsequent step 280, target displacements Xd1, Xd2, Xd3 and Xd4 of the suspensions 5, 6, 9 and 10 are calculated. Next, displacement errors X01, X02, X03 and X04, i.e., the differences between the above-mentioned target displacement and the actual displacement, are calculated at step 290. The voltage in response to each of these errors X01, X02, X03 and X04 is outputted at step 295. After this, the process step returns to step 210. This process routine is repeatedly executed hereafter.

In the second embodiment, the suspensions 5, 6, 9 and 10 correspond to the actuator M1; the speed sensor 27, the steering angle sensor 28, the lateral acceleration sensor 30 and the yaw rate sensor 31 corresond to the turning condition detection means M2; the ECU 40 and the process steps 260, 275, 280, 290 and 295 executed by the ECU 40 correspond to the control means M3.

Since the yaw rate correction coefficient Y is calculated by multiplying the yaw rate error by the lateral acceleration Ycg in the second embodiment, the effect set forth below is obtained in addition to the effects featured in the first embodiment. One of the additional effects is that the turning performance is swiftly changed from the preset steering state to the oversteering state at the beginning of steering, and also the turning performance is swiftly altered to the understeering state when the wheels are steered in the opposite direction. The reason why this effect can be obtained is set forth.

FIGS. 10A through 10D are timing charts for this embodiment.

The lateral acceleration Ycg (shown by a broken line in FIG. 10B) occurs at a time point T11 soon after a time point T10 when steering begins. At a later time point T12, the yaw rate γ (shown by a dashed line in FIG. 10C) develops. Therefore, the yaw rate correction coefficient Y (shown by a solid line in FIG. 10D) calculated in the second embodiment starts increasing from the time point T11. On the other hand, the yaw rate correction coefficient Y (shown by a double dash-interrupted line in FIG. 10D) calculated in the first embodiment starts incresing from the time point T12. As a result, in the second embodiment, the turning performance of the vehicle is more swiftly changed to the oversteering side at the beginning of steering in comparison with the first embodiment. On the same manner, when the wheels are steered in the opposite direction, the turning performance is swiftly changed to the understeering side. Thus, the delay time involved in the alteration of the turning performance can be shortened at the beginning of steering or when the wheels are steered in the opposite direction.

The lateral acceleration Ycg increases in proportion to the increase in the vehicle speed V when the steering angle θ is constant. The more the vehicle speed increases, the more the yaw rate correction coefficient increases, even though the yaw rate error is constant when the wheels are turned right or left. Thus, the front/rear allotment ratio of the load shift between the inner and the outer wheels largely changes in response to the vehicle speed. This is effective in improving maneuverability and stability when the vehicle turns during running in a high speed.

The third embodiment is hereinunder described based on FIGS. 11A through 14.

The prominent feature of the third embodiment different from the first embodiment is the way of calculating a target yaw rate. In the third embodiment, the target yaw rate is calculated from the steering angle, the vehicle speed, the square of the vehicle speed and a preset understeering coefficient based on the characteristic of the vehicle, while in the first embodiment, the target yaw rate is calculated by utilizing only the steering angle and the vehicle speed. Since the systematic constitution and values used for controlling suspensions of the third embodiment are common to the first embodiment, these common parts are denoted by the same numbers and symbols used in the first embodiment. The explanation for these parts is also referred to in the first embodiment.

Figure 11A:
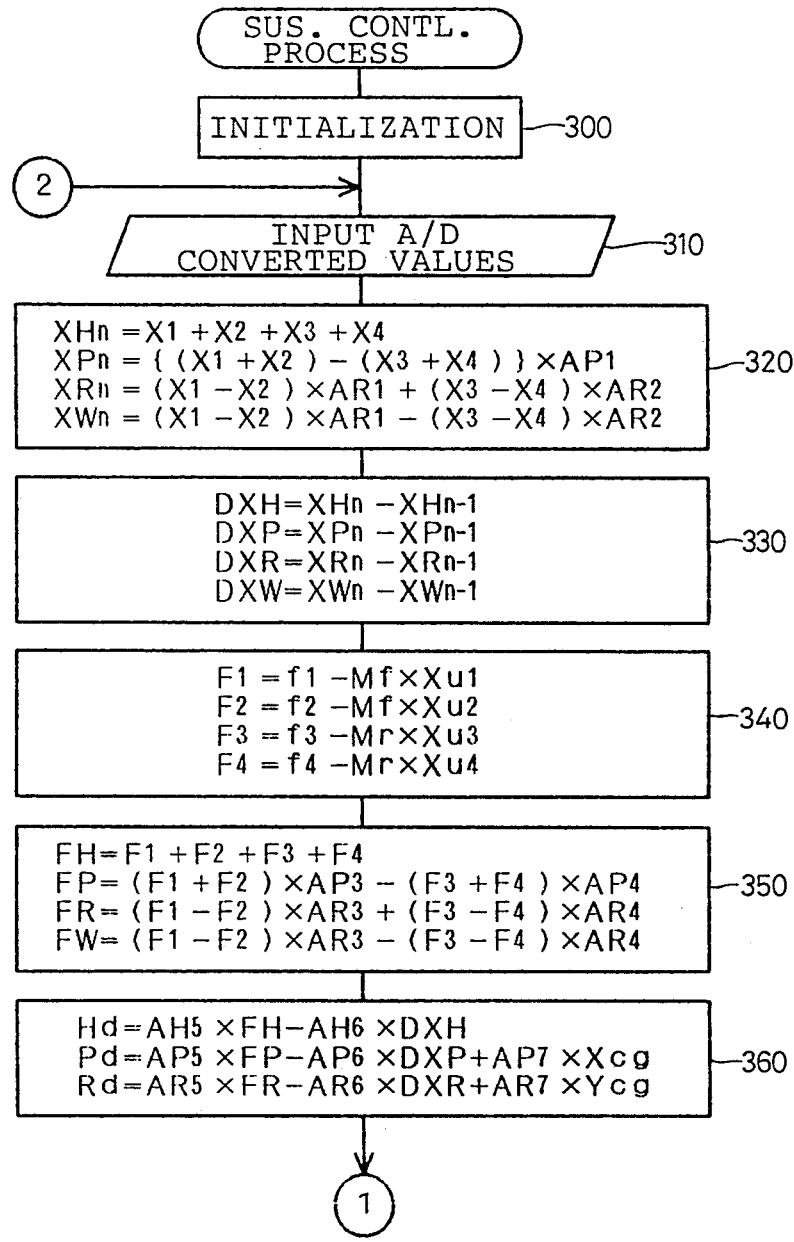
FIGS. 11A and 11B are flow charts integrally showing the control of the third embodiment of the invention.
Figure 11B:
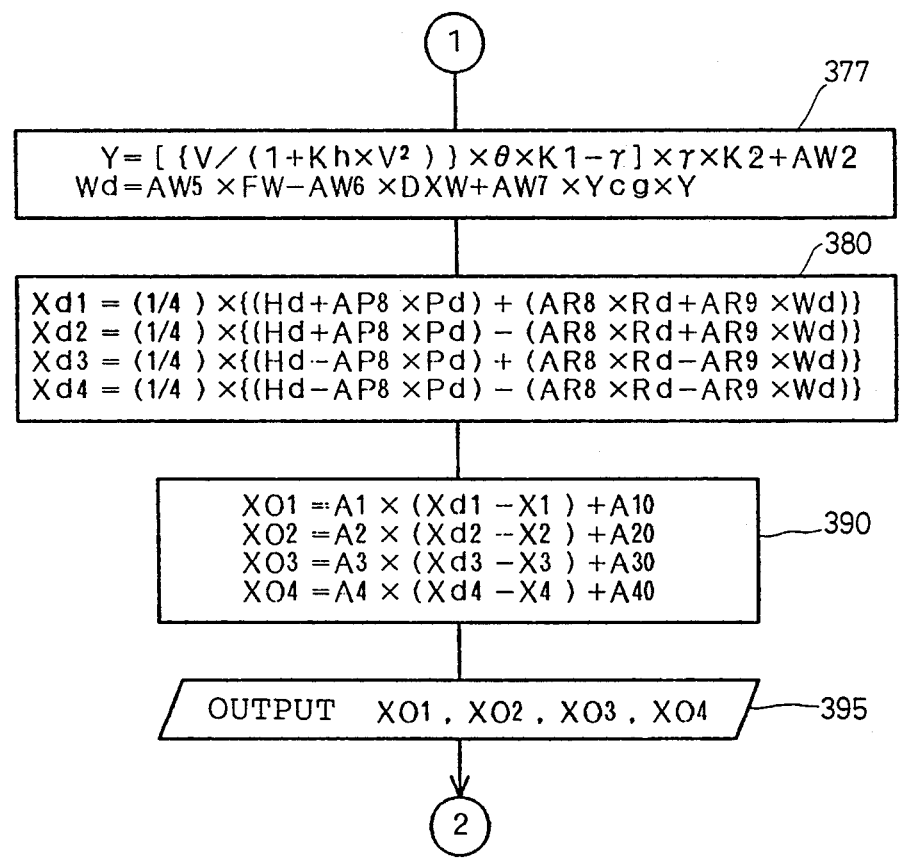

FIGS. 11A and 11B are flow charts showing the suspension control process utilized in the third embodiment. The process steps which are common to both the first and the third embodiments are numbered by using the last two digits of the step numbers used in the first embodiment. The present suspension control process routine is repeatedly executed every predetermined time interval after the ECU 40 is actuated.

At step 300, the initialization is executed, and next, the signals detected by various sensors are inputted at step 310. At the subsequent step 320, the current displacement of heave XHn, pitch XPn, roll XRn and warp XWn at G are all calculated. In addition, a heave speed DXH, a pitch speed DXP, a roll speed DXR and a warp speed DXW are calculated at step 330. At step 340, loads F1, F2, F3 and F4 are calculated and the process step proceeds to step 350 at which a heave load FH, a pitch torque FP, a roll torque FR and a warp torque FW at G are calculated. At step 360, target values of heave Hd, pitch Pd and roll Rd are calculated.

Next, the target yaw rate is calculated from the vehicle speed V, the understeering coefficient Kh, the square of the vehicle speed $V^2$ and the steering angle θ. By multiplying the yaw rate error by the yaw rate γ, the yaw rate correction coefficient Y is calculated in accordance with the following formula (33).

$$Y = [\{V/(1+Kh \cdot V^2)\} \cdot \theta \cdot K1 - \gamma] \cdot \gamma \cdot K2 + AW2 \qquad (33)$$

Kh: understeering coefficient
K1: actual yaw rate correction coefficient
K2: yaw rate correction coefficient gain.

By utilizing the above-calculated yaw rate correction coefficient Y, the warp speed DXW and the warp torque FW, the target warp Wd at the center of gravity is calculated at step 377.

The understeering coefficient Kh is a positive value which is determined based on the characteristic of the vehicle. By adjusting the coefficient Kh, the change of the steering feeling in response to the change of the vehicle speed is controlled to be minimized. The actual yaw rate correction coefficient K1 functions to maintain the interrelationship between the vehicle speed and the steering effect based on the above-mentioned understeering coefficient Kh. The change of the actual yaw rate correction coefficient corresponds to the change of the steering gear ratio. The yaw rate correction coefficient gain K2 determines the change of the front/rear allotment ratio of the load shift between the inner and the outer wheels when the actual yaw rate γ is different from the target yaw rate.

At step 380, the target displacements Xd1, Xd2, Xd3 and Xd4 of the suspensions 5, 6, 9 and 10 are calculated, and then, the errors X01, X02, X03 and X04 between the target displacements and the actual displacements are calculated at step 390. Thus, the voltage corresponding to each of the difference is outputted at step 395. After this, the process step returns to step 310. The present routine is repeatedly executed thereafter.

In the third embodiment, the suspensions 5, 6, 9 and 10 correspond to the actuator M1, and the vehicle speed sensor 27, the steering angle sensor 28 and the yaw rate sensor 31 correspond to the turning condition detection means M2. The ECU 40 and the process steps 360, 370, 380, 390 and 395 executed by the ECU 40 correspond to the control means M3.

As described before, the target yaw rate is calculated by utilizing the vehicle speed V, the understeering coefficient Kh, the square of the vehicle speed $V^2$ and the steering angle θ. As a result, the effect as set forth can be obtained in addition to the effects obtained in the first embodiment. Namely, the steering effect at slow speed is kept favorably, and also the steering effect in a high speed is prevented from overcompensation.

Figure 12:
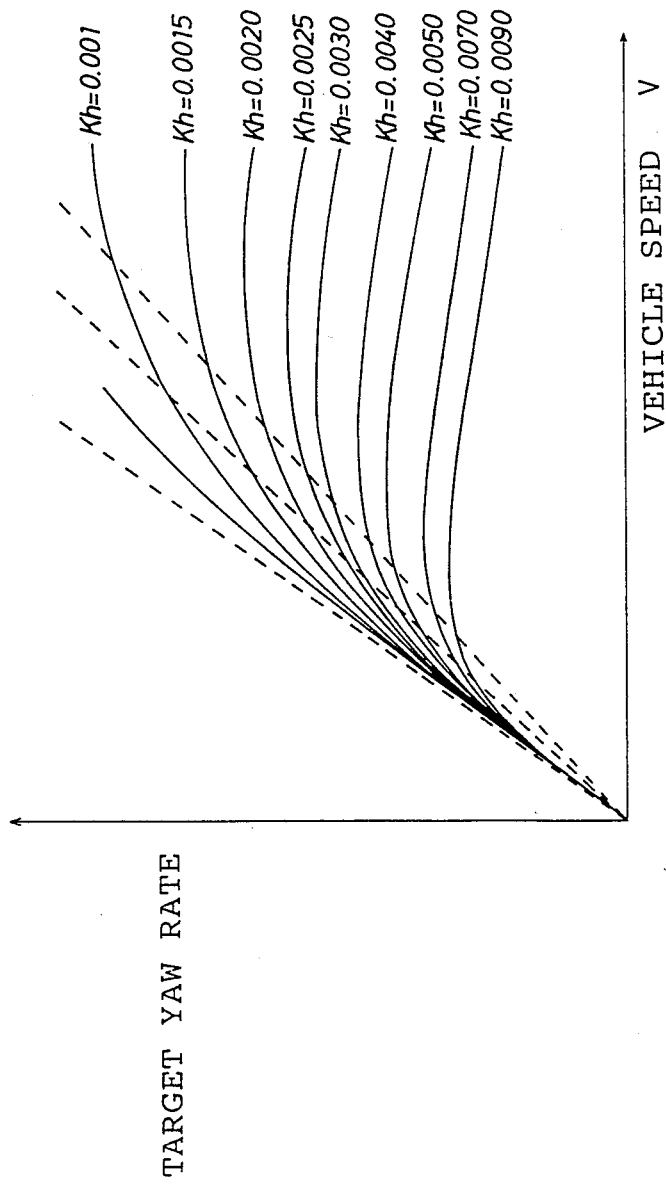
FIG. 12 is a graph showing a relationship between the vehicle speed and the target yaw rate at various Kh values.
Figure 13:
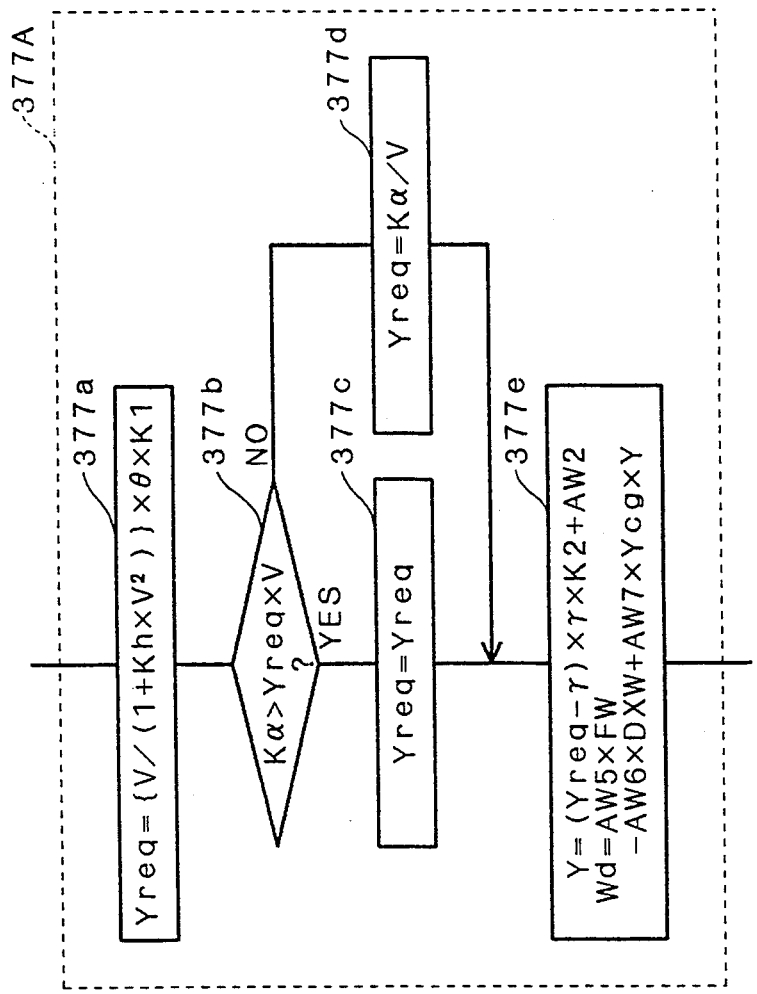
FIG. 13 is a substitute flow chart for the control of a variation of the third embodiment.

As shown in FIG. 12, the target yaw rate in the first embodiment (shown by solid lines) is gradually saturated to a certain value or reduced. In the third embodiment, therefore, the difference of the steering effect between high speed and slow speed is decreased. On the other hand, the target yaw rate (shown by dashed lines) which is obtained by multiplying the vehicle speed V by the steering angle $\theta$ increases in proportion to the increase in the vehicle speed V as described in the first embodiment. Thus, desirable steering effect can be successfully obtained at a slow speed, and also an overcompensatory effect can be controlled at a high speed at the same steering angle $\theta$. Accordingly, in the third embodiment, the turning performance under the high speed condition is improved without impairing the maneuverability of the vehicle running at slow speed. Thus, the steady drive feeling is assured regardless of the change of the vehicle speed. Especially, a feeling of imcompatibility during driving at high speed is removed so as to realize a comfortable driving.

The understeering coefficient Kh is determined based on the characteristic of the vehicle. As shown in FIG. 12, the smaller the coefficient becomes, the more improved the maneuverability of the vehicle is. In addition, the larger the yaw rate correction coefficient gain K2 becomes, the higher the steering response is improved so as to make the yaw rate $\gamma$ approach the target yaw rate.

In the third embodiment, the yaw rate correction coefficient Y is calculated in accordance with the formula (33) shown at step 377 of FIG. 11B from the target yaw rate (calculated based on the vehicle speed V) the understeering coefficient Kh, the square of the vehicle speed $V^2$ and the steering angle $\theta$. However, it is possible to limit the calculated target yaw rate so as not to surpass the maximum tolerable yaw rate of the vehicle. Namely, the turning performance of the vehicle is limited by the friction coefficient between the wheels and the road surface. For example, the friction coefficient $\mu$ between the rubber-made wheel and the dry asphalt road surface is approximately 0.9 (experimental data). Under this condition, the greatest turning performance (or maximum lateral acceleration Ycg) of the vehicle is at most 1 g (gravitational acceleration 9.8 m/sec$^2$). The relationship among the lateral acceleration Ycg m/sec$^2$, the yaw rate rad/sec and the vehicle speed V msec is shown by the following formula (33a).

$$Ycg = \gamma \cdot V \qquad (33a)$$

Accordingly, the turning condition of the vehicle can be fixed within the limit of the turning performance, if the upper limit of the target yaw rate Yreq is fixed so that the lateral acceleration Ycg (the product of the target yaw rate Treq and the vehicle speed V) is not more than the gravitational acceleration. This is realized by executing a series of process steps 377A in the flow chart of FIG. 13 instead of the process step 377 in FIG. 11B.

Each of the process steps 377a through 377e of 377A is now described. First, at step 377a, the target yaw rate Yreq is calculated in accordance with the formula (33b).

$$Yreq = \{V/(1 + Kh \cdot V^2)\} \cdot \theta \cdot K1 \qquad (33b)$$

At the following step 377b, it is determined whether or not the lateral acceleration which is calculated by multiplying the target yaw rate Yreq shown in the above by the vehicle speed V is less than a preset lateral acceleration constant K$\alpha$ (which is less than the gravitational acceleration 9.8 m/sec$^2$). If the result is 'YES' (K$\alpha$ < Yreq·V), the process step proceeds to step 377c; if 'NO' (K$\alpha \geq$ Yreq x V), the process step proceeds to step 377d. At step 377c, the target yaw rate Yreq is set by utilizing the target yaw rate calculated at step 377a, and the process step proceeds to step 377e. On the other hand, at step 377d, the target yaw rate Yreq is set by utilizing the maximum tolerable yaw rate which is obtained by dividing the lateral acceleration constant K$\alpha$ by the vehicle speed V. Then, the process step proceeds to step 377e. At step 377e, the yaw rate correction coefficient Y is calculated according to the following formula (33c) by utilizing the target yaw rate Yreq which is set at either step 377c or 377d.

$$Y = (Yreq - \gamma) \cdot \gamma \cdot K2 + AW2 \qquad (33c)$$

Moreover, the target warp Wd at the center of gravity is calculated based on the above-calculated yaw rate correction coefficient Y.

Figure 14:
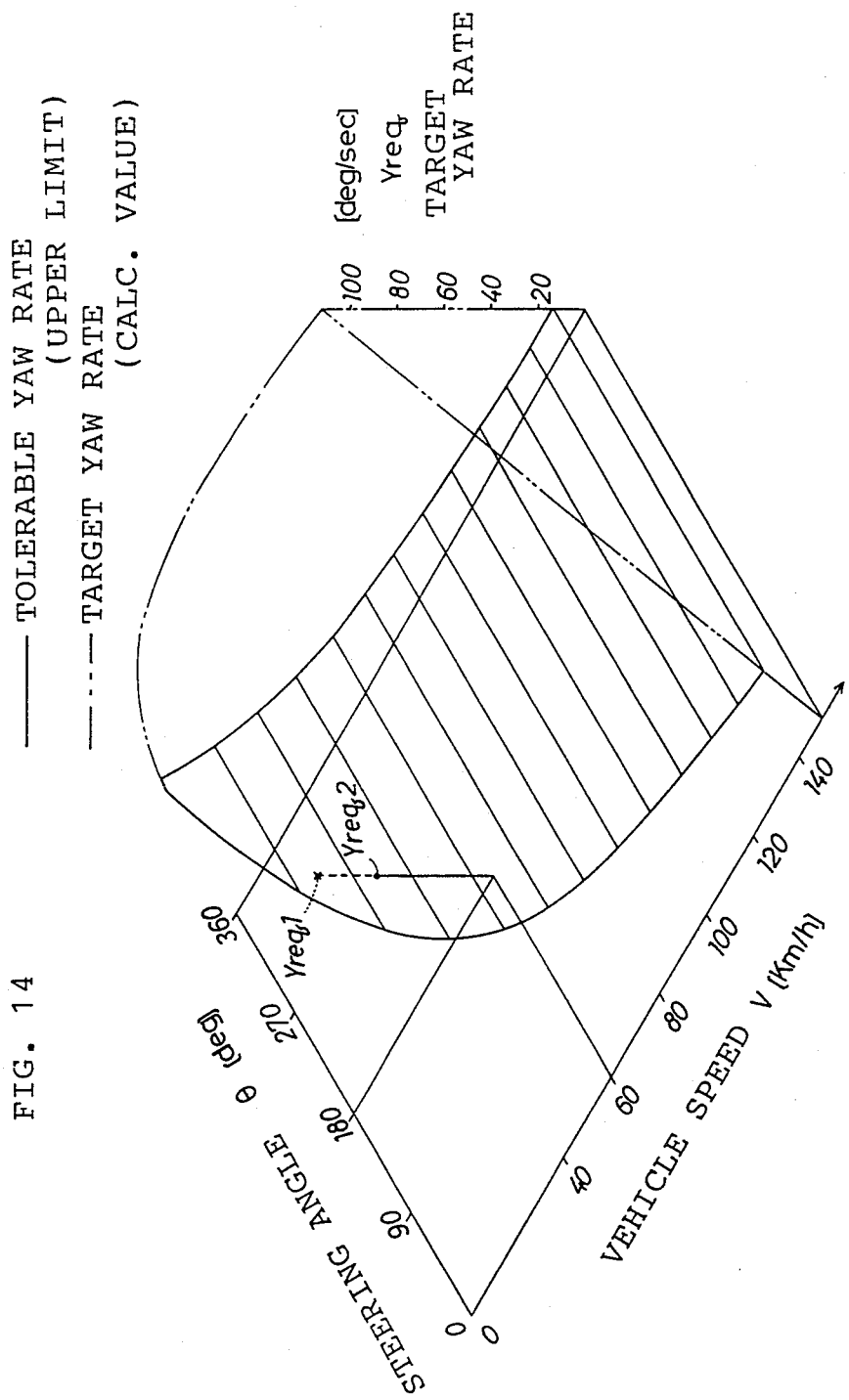
FIG. 14 is a three dimensional graph showing a relationship among the vehicle speed, the steering angle and the target yaw rate of the above case.

If the lateral acceleration is limited to be less than the preset lateral acceleration constant K$\alpha$, the maximum tolerable yaw rate is determined as shown by a quadratic surface (drawn by slid lines) in FIG. 14 in response to the change in the vehicle speed and the steering angle $\theta$. The quadratic surface shown in FIG. 14 is an example when the lateral acceleration constant K$\alpha$ is conformed to the gravitational acceleration (9.8 m/sec$^2$). On the other hand, when the understeering coefficient Kh is 0.01, the target yaw rate calculated at step 377a becomes larger than the maximum tolerable yaw rate as shown by the double-dash interrupted line. For example, when the vehicle speed V is 60 km/h and the steering angle $\theta$ is 180°, the target yaw rate Yreq1 calculated at step 377a is 50 deg/sec. In this case, the lateral acceleration calculated in the formula (33a) by utilizing the yaw rate Yreq1 and the vehicle speed V (60 km/h) becomes 14.54 m/sec$^2$. Namely, it becomes greater than the lateral acceleration constant K$\alpha$ (9.8 m/sec$^2$). Accordingly, the target yaw rate Yreq is limited to the value Yreq2 (approx. 34 deg/sec) on the quadratic surface defining the tolerable yaw rate as shown in FIG. 14.

When the lateral acceleration (the product of the target yaw rate and the vehicle speed V) becomes larger than the lateral acceleration constant K$\alpha$, if the acceptable maximum yaw rate calculated by dividing the lateral correction constant K$\alpha$ by the vehicle speed V is used as the target yaw rate Yreq, the difference between the target yaw rate Yreq and the actual yaw rate $\gamma$ is prevented from excessively increasing. Thus, the front allotment of the load shift between the inner and the outer wheels is set so as not to be excessively small. Accordingly, the occurrence of spinning or wheel lifting of a inner rear wheel can be prevented, even though the steering angle $\theta$ is large. As a result, the stability of the vehicle during turning is improved.

When the steering angle $\theta$ is small, satisfactory steering effect is assured. Besides when the steering angle $\theta$ is large, the stability of the vehicle is improved.

Since all of the four wheels are always in contact with the road surface, the suspension control for adjusting the so-called active suspension control for controlling the front/rear allotment ratio of the load shift between the inner and the outer wheels can be favorably realized.

In the above-mentioned case, the lateral acceleration constant K$\alpha$ is set equal to the gravitational acceleration 9.8 m/sec$^2$ as an example. For another example, the lateral acceleration constant K$\alpha$ can be selected from preferable values less than the gravitational acceleration in response to the friction coefficient between the wheels and the road surface, or to the characteristic of the vehicle.

The explanation of the fourth embodiment of this invention is set forth below in reference to FIGS. 15 through 17. The prominent feature of the fourth embodiment is that the control is executed so as to maintain the predetermined turning performance even though the payload of the vehicle varies. When the vehicle is stationary or normally cruising, the load distribution on the front and the rear axles is detected, and the front-/rear allotment ratio of the right/left load shift is controlled during turning in response to the axle load distribution. Since the systematic constitution of the fourth embodiment is the same as that of the first embodiment, the common parts are denoted by utilizing the numbers and symbols used in the first embodiment. The explanation for those parts are also referred to the first embodiment.

Figure 15:
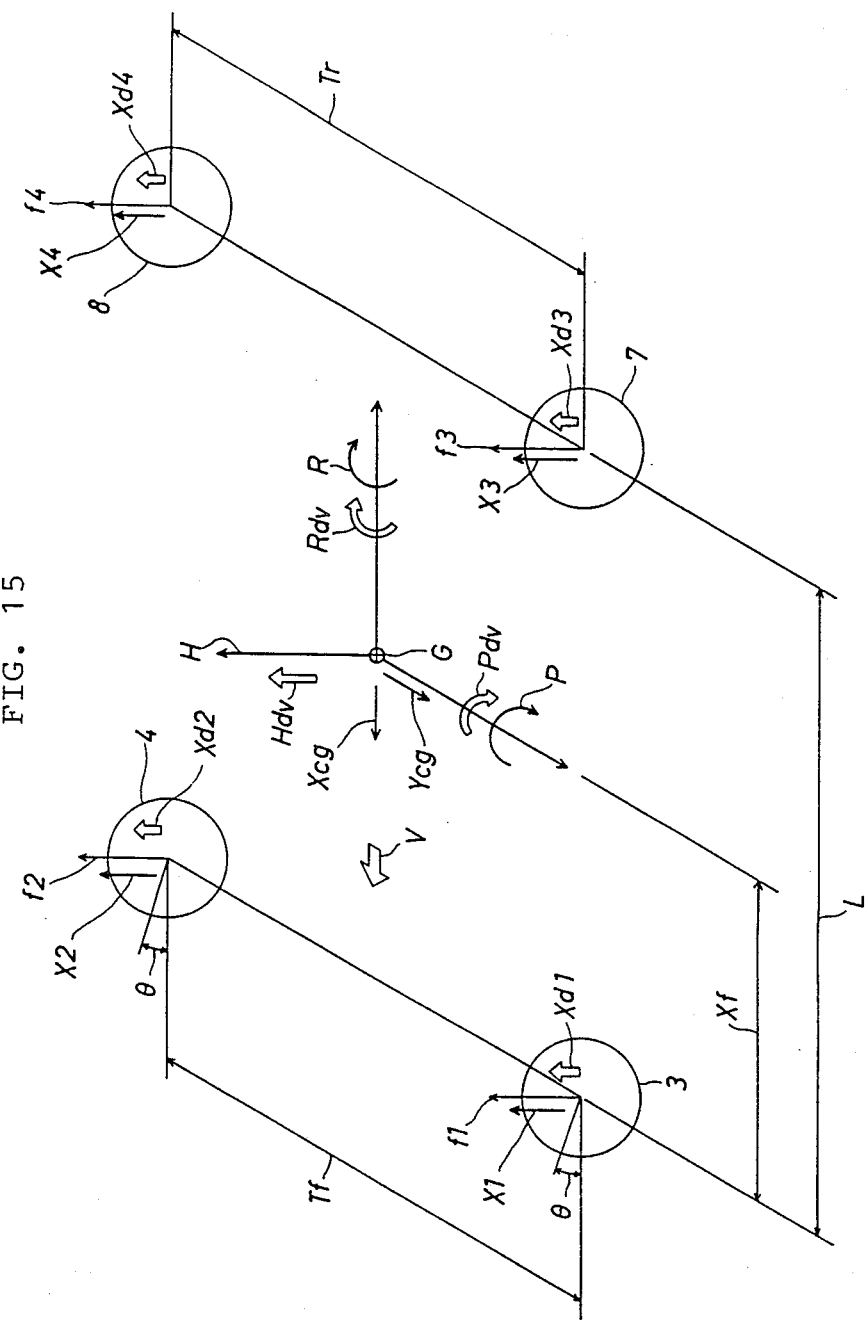
FIG. 15 is an illustration for explaining various forces and moments on the vehicle body in case of the fourth embodiment.

The interrelationship among various values utilized in the fourth embodiment is set forth in reference to FIG. 15.

Displacements X1, X2, X3 and X4 of the suspensions for the wheels 3, 4, 7 and 8 are detected respectively by the displacement converters 11, 12, 13 and 14. Each of loads f1, f2, f3 and f4 is detected by corresponding load sensors 15, 16, 17 and 18. A longitudinal acceleration Xcg and a lateral acceleration Ycg at the center of gravity G are respectively detected by a longitudinal acceleration sensor 29 and a lateral acceleration sensor 30. The vehicle speed V and the steering angle $\theta$ are respectively detected by the vehicle speed sensor 27 and the steering angle sensor 28.

Based on the above-mentioned various data, the movement condition of the suspensions for each of the wheels 3, 4, 7 and 8 is converted into three types of movement modes at the center of gravity G of the vehicle. The three modes are as follows: heave, i.e., vertical vibration shown by an arrow H; pitch, i.e., rotational vibration around the transverse axis through G shown by an arrow P; and roll, i.e., rotational vibration around the longitudinal axis through G shown by an arrow R.

Next, a difference (error) between the target values at the center of gravity G and the actually detected values are calculated in response to each of the above-mentioned three movement modes. Namely, a heave error Hdv, a pitch angle error Pdv, and a roll angle error Rdv are respectively calculated from a target heave Hreq, a target pitch angle Preq and a target roll angle Rreq. Moreover, the abovecalculated errors Hdv, Pdv and Rdv are converted into the target displacements xd1, xd2, xd3 and xd4 of the suspension strokes at the wheels 3, 4, 7 and 8. The ECU 40 controls the servo valves so that each suspension stroke displacement becomes equal to the above-mentioned target displacement. In FIG. 15, wheel base, front wheel tread and rear wheel tread are respectively denoted as L, Tf and Tr.

The front/rear allotment ratio, which is represented by RC of the inner/outer load shift which occurs due to the lateral acceleration during turning is calculated in accordance with the following formula (34).

$$RC = [(\Delta f1 - \Delta f2)/\{(\Delta f1 - \Delta f2) + (\Delta f3 - \Delta f4)\}] \cdot 100 \quad (34)$$

$\Delta f1$: load change at the left front wheel
$\Delta f2$: load change at the right front wheel
$\Delta f3$: load change at the left rear wheel
$\Delta f4$: load change at the right rear wheel If only the stationary vibration is considered disregarding the damping term, the relationship between the displacement X of each wheel and the load change amount $\Delta f$ is shown in the following formula (35).

$$X = \Delta f/k \quad (35)$$

k: spring constant.

The load shift allotment ratio, or roll stiffness allotment RC is determined by the load changes $\Delta f$ at the wheels. The load change $\Delta f$ can be varied by two kinds of methods set forth below.

(1) the spring constant k is varied keeping the displacement X constant.

(2) the displacement X is varied keeping the spring constant k unchanged.

In the fourth embodiment, the method (2) is utilized. Namely, the target displacements xd1, xd2, xd3 and xd4 for each of the wheels are calculated, and the servo valves 23, 24, 25 and 26 of the suspensions 5, 6, 9 and 10 are driven so as to achieve the target displacements. The suspension control is thus executed so that the front/rear allotment ratio of the inner/outer load shift during turning is altered to a desired value.

Figure 16:
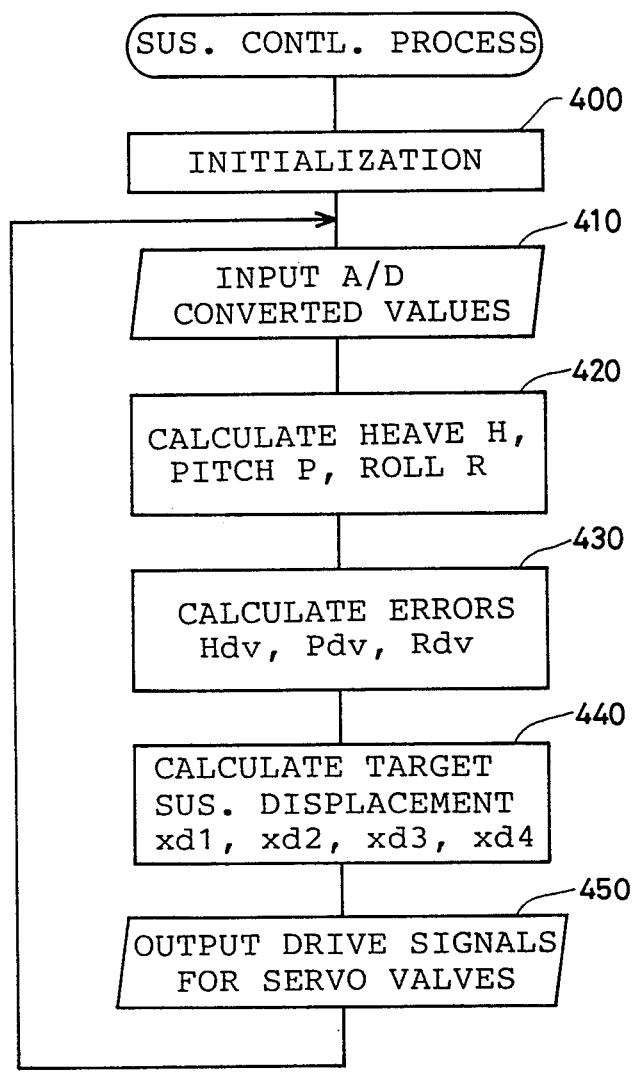
FIGS. 16 and 17 are flow charts for the control of the fourth embodiment of the invention.

FIG. 16 is a flow chart showing the suspension control process routine executed by the ECU 40. FIG. 17 is a flow chart showing the process routine of calculating the roll stiffness allotment correction coefficient. Set forth below are the explanations for each of these process routines.

The suspension control process routine shown in FIG. 16 is repeatedly executed at every predetermined time interval after the ECU 40 is actuated. At step 400, the RAM 40c is cleared, and the predetermined target values of heave Hreq, pitch angle Preq, and roll angle Rreq are set. Moreover, the roll stiffness allotment correction coefficient Wcomp is initialized at zero. At the subsequent step 410, the signals generated by the various sensors are A/D converted assigned as the values of variables of the displacements X1, X2, X3 and X4, the lateral acceleration Ycg and the vehicle speed V.

Based on the above-mentioned displacement X1, X2, X3 and X4, a heave H, a pitch angle P and a roll angle R at the center of gravity are calculated in accordance with the following formulas (36) through (38) at step 420.

$$H = X1 + X2 + X3 + X4 \quad (36)$$

$$P = \{(X1 + X2) - (X3 + X4) \cdot AP1 \quad (37)$$

$$R = (X1 - X2) \cdot AR1 + (X3 - X4) \cdot AR2 \quad (38)$$

$AR1 = (Xf/L) \cdot (1/Tf)$
$AR2 = \{(L - Xf)/L\} \cdot (1/Tr)$.

At step 430, a heave error Hdv, a pitch angle error Pdv and a roll angle error Rdv are calculated in the following formulas (39) through (41) by utilizing the target values Hreq, Preq and Rreq set at step 400, and the heave H, the pitch angle P and the roll angle R calculated at step 420.

$$Hdv = Hreq - H \quad (39)$$

$$Pdv = Preq - P \quad (40)$$

$$Rdv = Rreq - R \quad (41)$$

At the subsequent step 440, the target displacements xd1, xd2, xd3 and xd4 of the suspensions 5, 6, 9 and 10 of the wheels 3, 4, 7 and 8 are calculated based on the abovecalculated errors Hdv, Pdv and Rdv in accordance with the following formulas (42) through (45).

$$xd1 = (\tfrac{1}{4}) \cdot \{(Hdv + AP8 \cdot Pdv) + (AR8 \cdot Rdv + Wcomp \cdot Ycg)\} \quad (42)$$

$$xd2 = ((\tfrac{1}{4})) \cdot \{[Hdv + AP8 \cdot Pdv) + (AR8 \cdot Rdv + Wcomp \cdot Ycg)\} \quad (43)$$

$$xd3 = ((\tfrac{1}{4})) \cdot \{[Hdv + AP8 \cdot Pdv) + AR8 \cdot Rdv - Wcomp \cdot Ycg)\} \quad (44)$$

$$xd4 = ((\tfrac{1}{4})) \cdot \{[Hdv + AP8 \cdot Pdv) + (AR8 \cdot Rdv - Wcomp \cdot Ycg)\} \quad (45),$$

where
$AP8 = L = (1/AP1)$
$AR8 = (L \cdot Tf)/Xf = (1/AR1)$
Ycg: lateral acceleration.

The roll stiffness allotment correction coefficient Wcomp utilized in the above formulas is initialized to be 0 at step 400, and after that, is updated in accordance with the calculation process steps described later.

At step 450, the drive signals in response to each of the target displacements xd1, xd2, xd3 and xd4 calculated at step 440 are outputted to each corresponding servo valves 23, 24, 25 and 26 of the suspensions 5, 6, 9 and 10, and the process step returns to step 410. The present suspension control routine is repeatedly executed thereafter.

Figure 17:
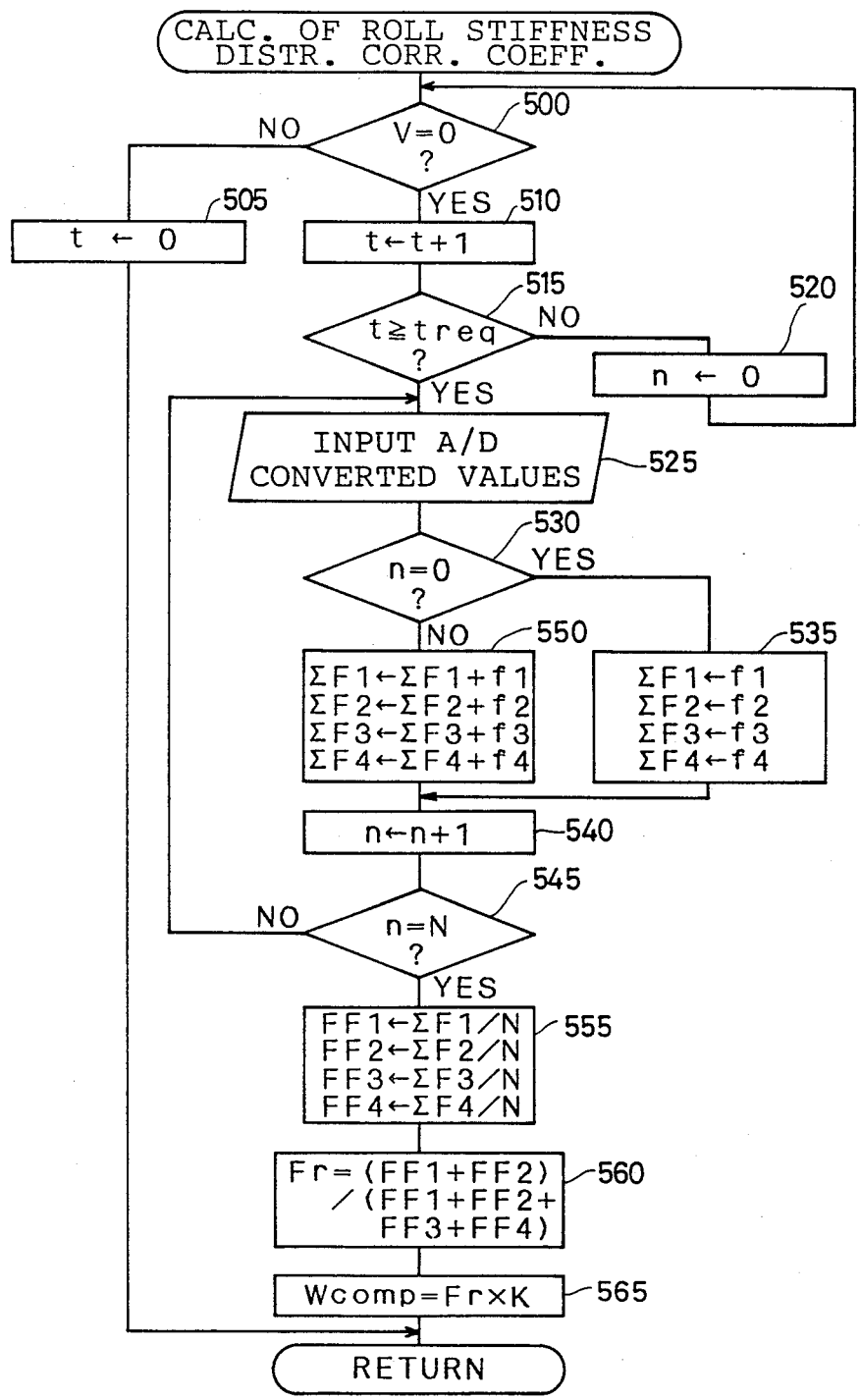

The process routine for calculating the roll stiffness allotment correction coefficient is now described in reference to the flow chart of FIG. 17. This routine is executed every predetermined time interval by the interruption. At step 500, it is determined whether the vehicle speed V is 0. If the vehicle speed is 0, the process step proceeds to step 510, while if not, the process step proceeds to step 505. At step 505 which is executed only when the vehicle is moving, the timer t is reset to 0. Then, the present routine is terminated.

On the other hand, when the vehicle is determined to be stationary at step 500, step 510 is executed where the timer t is increased by 1. At the subsequent step 515, it is determined whether the time shown by the timer t is greater than or equal to the preset time treq. If the answer is 'YES' (t ≧ treq), the process step proceeds to step 525; if 'NO' (t < treq), the process step proceeds to step 520. Namely, step 520 is executed when it is determined a preset time interval has not elapsed. At this step, the counter in is reset to 0, and the process step returns to step 500.

If it is determined that the vehicle has been stationary at least for the time interval of treq, the process step 525 is executed. At this step, A/D converted values of signals generated by the load sensors 15, 16, 17 and 18 are inputted as loads f1, f2, f3 and f4. At step 530, it is determined whether the value of the counter n is 0. If the answer is 'YES', the process step proceeds to step 535; if 'NO', it proceeds to step 550. At step 535, the initial values of the accumulated loads ΣF1, ΣF2, ΣF3 and ΣF4 of the wheels 3, 4, 7 and 8 are equaled with the loads f1, f2, f3 and f4 inputted at step 525. At the subsequent step 540, the counter n is increased by 1, and the process step proceeds to step 545. At this step, it is determined whether the value of the counter n has attained a preset value N. If the result is 'YES', the process step proceeds to step 555. On the other hand, if the value of the counter n has not attained the value N, the process step returns to step 525, and then it proceeds to step 550 via step 530. At step 550, the loads f1, f2, f3 and f4 inputted at step 525 are added to the accumulated loads ΣF1, ΣF2, ΣF3 and ΣF4 as shown in the following formula (46) through (49).

$$\Sigma F1 = \Sigma F1 + f1 \quad (46)$$

$$\Sigma F2 = \Sigma F2 + f2 \quad (47)$$

$$\Sigma F3 = \Sigma F3 + f3 \quad (48)$$

$$\Sigma F4 = \Sigma F4 + f4 \quad (49)$$

After that, the value of the counter n is increased by 1 at step 540, and the process step proceeds to step 545. Such a processing loop from step 525 to step 545 is repeated until the value of the counter n attains the value N. If the counter value attains N, step 555 is executed. At this step, mean values FF1, FF2, FF3 and FF4 of the loads are calculated in accordance with the following formulas (50) through (53).

$$FF1 = \Sigma F1/N \quad (50)$$

$$FF2 = \Sigma F2/N \quad (51)$$

$$FF3 = \Sigma F3/N \quad (52)$$

$$FF4 = \Sigma F4/N \quad (53)$$

At the subsequent step 560, the axle load distribution at the front axle Fr is calculated in the following formula (54) by utilizing the mean loads FF1, FF2, FF3 and FF4 calculated at step 555.

$$Fr = (FF1 + FF2)/(FF1 + FF2 + FF3 + FF4) \quad (54)$$

Then, the process step proceeds to step 565 at which the roll stiffness allotment correction coefficient Wcomp is calculated in the formula (55) by utilizing the load distribution at the front axle Fr calculated at step 560.

$$Wcomp = Fr \cdot K \quad (55)$$

K: coefficient determined based on the dimensions of the vehicle.

Then, the present routine for calculating the roll stiffness allotment correction coefficient is concluded. Thereafter, the present routine is repeatedly executed at every predetermined time interval as begun.

In the fourth embodiment, the suspensions 5, 6, 9 and 10 and the servo valves 23, 24, 25 and 26 correspond to the actuator M1. The load sensor 15, 16, 17 and 18, the ECU 40 and the process steps 535, 54, 545, 550, 555, 560 and 565 executed by the ECU 40 correspond to the turning condition detection means M2. Moreover, the ECU 40 and the process steps 430, 440 and 450 executed by the ECU 40 correspond to the control means M3.

The fourth embodiment is summarized as follows: (1) the difference (errors) Hdv, Pdv and Rdv between the target values and the actual values concerning heave, pitch and roll are calculated; (2) each of the calculated errors are converted into the target displacements xd1, xd2, xd3 and xd4; (3) when the suspensions 5, 6, 9 and 10 are controlled based on the above-mentioned target displacements, the roll stiffness correction coefficient Wcomp is calculated by utilizing the load distribution Fr at the front axle detected when the vehicle is stationary; (4) the above-mentioned target displacements xd1, xd2, xd3 and xd4 are corrected by utilizing the product of the roll stiffness correction coefficient Wcomp and the lateral acceleration Ycg.

When the vehicle is turning, warp occurs in proportion to the lateral acceleration. When the vehicle starts turning under the condition that the front load distribution is large, e.g., when only a driver is sitting in the vehicle, the rear allotment ratio of the inner/outer load shift is increased in the fourth embodiment so as to prevent the turning performance from altering to the understeering state and thus to improve the maneuverability of the vehicle. On the other hand, when the vehicle starts turning under the condition that the rear load distribution is large, e.g., when the seats are fully occupied or the trunk is carrying loads, the front allotment of the inner/outer load shift is increased so as to prevent the turning performance from altering to the oversteering state, thereby wheel-balanced turning is assured. Thus, the turning performance can be maintained in a desired condition even through the load distribution varies. As a result, maneuverability and stability of the vehicle can be improved.

Since the change of the turning performance due to the change in the load distribution can be controlled, there is no need to consider the respective turning performance varying in response to various load conditions. Accordingly the scope of the suspension characteristic becomes wide and the degree of freedom for designing a suspension system is increased.

The load distribution at the front axle Fr was calculated according to the following procedure. First, loads f1, f2, f3 and f4 of the wheels are accumulated N times. Next, the mean values FF1, FF2, FF3 and FF4 are calculated. Based on these mean values FF1, FF2, FF3 and FF4, the load distribution Fr at the front axle is calculated. As a result, it becomes possible to eliminate the external turbulences, e.g., due to the fluctuation of the engine revolution, which is likely to occur during calculations of load. Accordingly, an accurate load distribution based on the mean values FF1, FF2, FF3 and FF4 with minimum errors can be obtained, thereby improving the calculation.

The addition of the load was resumed when it is determined that at least the preset time interval treq has elapsed after the vehicle is stopped. The calculation was not executed under the condition that the load at the front axle is increasing due to an inertia immediately after braking, so that the load of each wheel under the normal condition can be accurately detected.

In the above explanation for calculating the roll stiffness allotment correction coefficient, the load distribution is calculated by adding loads only in the case that the vehicle has been stationary at least for the time interval treq. However, it is possible to calculate the load distribution when the vehicle is cruising on a flat road at a constant speed.

Figure 18:
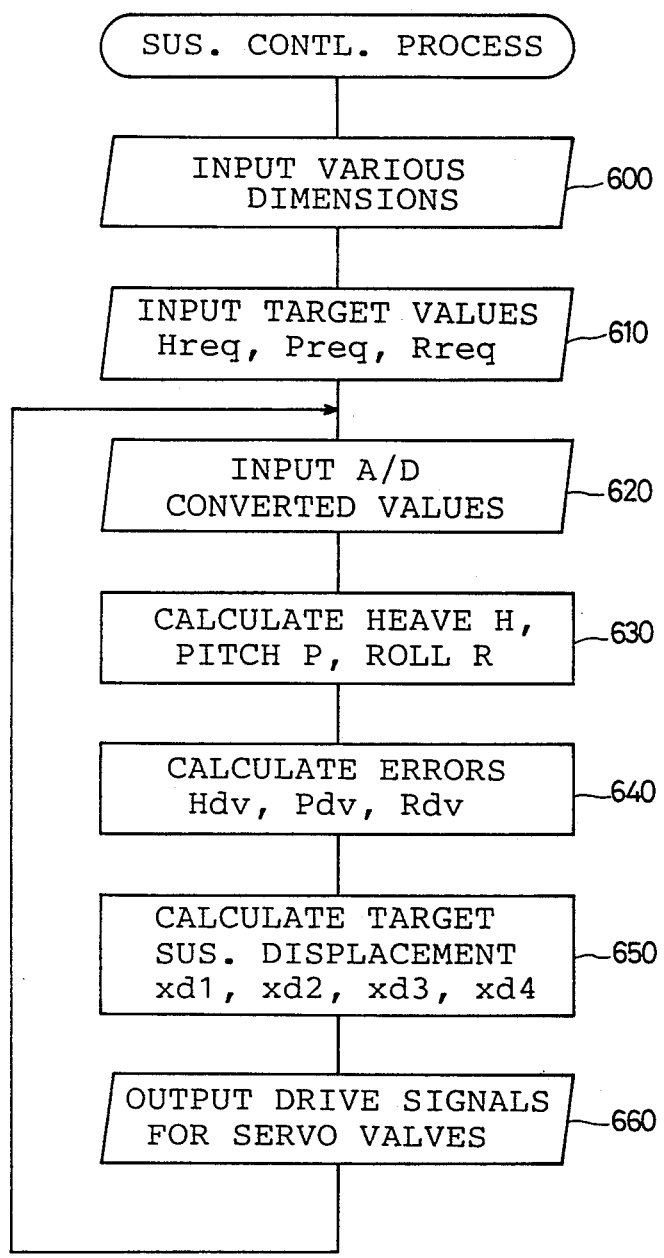
FIG. 18 is a flow chart for the control of the fifth embodiment of the invention.

Next, the fifth embodiment is described based on FIGS. 18 and 19. The prominent feature of the fifth embodiment is that the control is executed so as to maintain stability while the brake is applied during turning. Namely, when the turning condition is detected, the longitudinal acceleration is also detected, and the front/rear allotment ratio of the inner/outer load shift is controlled in response to the longitudinal acceleration. Since the systematic constitution of the fifth embodiment is almost the same as that of the first embodiment and the various values utilized for control in the fifth embodiment are common to those of the fourth embodiment, the common parts are denoted by the same numbers and symbols. The explanation is also referred to the first and the fourth embodiments, respectively.

FIG. 18 is a flow chart showing the suspension control process routine of the fifth embodiment. This process routine is repeatedly executed every predetermined time interval after the ECU 40 is executed.

At step 600, various dimensions of the vehicle, i.e., the wheel base L, the distance Xf between the center of gravity G and the front axle, the front wheel tread Tf and the rear wheel tread Tr are read out from a ROM 40b. At step 610, the predetermined target values of heave Hreq, pitch angle Preq and roll angle Rreq are also read out. At the subsequent step 620, various signals generated by various sensors are A/D converted and then inputted. Namely, displacements X1, X2, X3 and X4, longitudinal acceleration Xcg and lateral acceleration Ycg are inputted. Then, the process step proceeds to step 630 at which a heave displacement H, a pitch angle P and a roll angle R at the center of gravity G are calculated based on the detected suspension stroke displacements X1, X2, X3 and X4 in accordance with the following formulas (56) through (58).

$$H = X1 + X2 + X3 + X4 \tag{56}$$

$$P = \{(X1+X2)-(X3+X4)\} \cdot AP1 \tag{57}$$

$$R = (X1-X2) \cdot AR1 + (X3-X4) \cdot AR2 \tag{58}$$

$AP1 = 1/L$
$AR1 = (Xf/L) \cdot (1/Tf)$
$AR2 = \{(L-Xf)/L\} \cdot (1/Tr)$.

At step 640, the difference (error) between the target values Hreq, Preq and Rreq set at step 610 and the heave H, the pitch angle P and the roll angle R, namely, a heave difference Hdv, a pitch angle difference Pdv and a roll angle difference Rdv are calculated as shown in the following formulas (59) through (61).

$$Hdv = Hreq - H \tag{59}$$

$$Pdv = Preq - P \tag{60}$$

$$Rdv = Rreq - R \tag{61}$$

By utilizing the above-calculated errors Hdv, Pdv and Rdv, target displacements xd1, xd2, xd3 and xd4 of the suspensions 5, 6, 9 and 10 for the wheels 3, 4, 7 and 8 are calculated at step 650 in accordance with the following formulas (62) through (65).

$$xd1 = (\tfrac{1}{4}) \cdot \{(Hdv + AP8 \cdot Pdv) + (AR8 \cdot Rdv + KK \cdot Xcg \cdot Ycg) \tag{62}$$

$$xd2 = (\tfrac{1}{4}) \cdot \{(Hdv + AP8 \cdot Pdv) - (AR8 \cdot Rdv + KK \cdot Xcg \cdot Ycg) \tag{63}$$

$$xd3 = (\tfrac{1}{4}) \cdot \{(Hdv - AP8 \cdot Pdv) + (AR8 \cdot Rdv + KK \cdot Xcg \cdot Ycg) \tag{64}$$

$$xd4 = (\tfrac{1}{4}) \cdot \{(Hdv - AP8 \cdot Pdv) - (AR8 \cdot Rdv + KK \cdot Xcg \cdot Ycg) \tag{65}$$

$AP8 = L + (1/AP1)$
$AR8 = (L \cdot Tf)/Xf - (1/AR1)$
KK: a constant based on the dimensions of the vehicle.

In this case, the longitudinal acceleration Xcg is set to be positive when decelerating and the lateral acceleration Ycg is set to be positive when the vehicle is turning clockwise.

At step 660, drive signals in response to the target displacements xd1, xd2, xd3 and xd4 calculated at step 650 are outputted to the servo valves 23, 24, 25 and 26 of each corresponding suspensions 5, 6, 9 and 10. Then, the process step returns to step 620. After this, the present suspension control process routine (steps 620–660) is repeatedly executed.

One example of the above-mentioned control process is set forth below in reference to the timing charts of FIGS. 19A through 19F. At a time point T21, the vehicle starts turning clockwise, and the lateral acceleration Ycg develops. At this time, the load shifts from the inner wheels (the right wheels) to the outer wheels (the left wheels). As a result, the load f1 on the left front suspension and the load f3 on the left rear suspension increases, while on the other hand, the load f2 on the right front suspension and the load f4 at the right front suspension decreases as shown by FIGS. 19A and 19B. At a time point T22, the brake is applied to the vehicle, and the longitudinal acceleration (deceleration) Xcg develops. As a result, the load on the front wheels increases and the load on the rear wheels decreases. In this case, if the influence of the longitudinal acceleration Xcg is not considered, the load f4 on the right rear suspension markedly decreases as shown by a dashed line in FIG. 19B; the right rear wheel is therefore apt to be locked. In the fifth embodiment, when the longitudinal acceleration (deceleration) occurs, the front allotment of the load shift between the inner/outer wheels is increased. Namely, the load shift from the right front wheel to the left front wheel is increased, and the load to shift from the right rear wheel to the left rear wheel is decreased by either adding or subtracting the term 'KK·Xcg·Ycg' as shown in the formulas (62) through (65). Accordingly, the loads f1, f2, f3 and f4 of the suspensions are controlled as shown in the solid lines in FIG. 19D so as to limit the decrease in the load f4 on the right (inner) rear wheel suspension. The right rear wheel is thus prevented from being locked. When the vehicle turns counterclockwise, the control for limiting the decrease in the load f3 at the left rear wheel is executed.

In the fifth embodiment, the suspensions 5, 6, 9 and 10 and the servo valves 23, 24, 25 and 26 correspond to the actuator M1. The longitudinal acceleration sensor 29 corresponds to the turning condition detection means M2. Moreover, the ECU 40 and the process steps 640, 650 and 660 executed by the ECU 40 correspond to the control means M3.

As described hereinbefore, in the fifth embodiment, the heave error Hdv, the pitch angle error Pdv and the roll angle error Rdv are calculated and they are converted into the target displacements xd1, xd2, xd3 and xd4 of the suspensions 5, 6, 9 and 10. To control the suspensions in response to the above-mentioned target displacements xd1, xd2, xd3 and xd4, the target displacements during turning are calculated by utilizing the longitudinal acceleration Xcb. If the brake is applied during turning, the front allotment of the inner/outer load shift is increased. Therefore, by controlling the decrease of the load at the inner rear wheel, the inner rear wheel is prevented from being locked. Thus, the stability is improved while the brake is applied during turning.

Since the front/rear allotment ratio of the inner/outer load shift is controlled only in the case that the longitudinal acceleration Xcg and the lateral acceleration Ycg occur, the vehicle is relieved from the problems, e.g., the decrease of braking effect during cruising or the deterioration of maneuverability during turning at a slow speed. As a result, the stability of the vehicle is improved.

As for a front-engine front-drive vehicle, the difference of the load between the right and left front wheels decreases as the rear allotment of the load shift between the inner/outer wheels increases. Thus, the acceleration slip of the inner front wheel during turning can be prevented so as to provide satisfactory acceleration efficiency.

On the other hand, as for a front-engine rear-drive vehicle, if the absolute value of the longitudinal acceleration Xcg calculated in the formulas (62) through (65) is utilized, the front allotment of the inner/outer load shift increases while accelerating during turning. Thus, the difference of the load between the right/left rear wheels decreases, thereby the acceleration slip of the inner rear wheel can be prevented during turning. Accordingly the stable acceleration can be realized during turning.

Obviously, numerous modifications and variations of the present invention are possible in the light of the above teachings. It is therefore to be understood that within the scope of the following claims, the invention may be practiced otherwise than as specifically described herein.

What is claimed is:

1. A controller for suspensions of a vehicle, comprising:
   an actuator provided between the body and every wheel of the vehicle;
   means for sensing a turning condition of the vehicle, the turning condition including a steering angle; and
   control means responsive to the sensed turning condition for driving the actuators in order to control the allotment ratio between the front and the rear axles of the load shift between the right and the left wheels so as to control steering characteristics of the vehicle.

2. The suspension controller according to claim 1, wherein the front axle is allotted with a smaller load shift when the vehicle is sensed to begin turning, while the rear axle is allotted with a smaller load shift when the steering operation is reversed.

3. The suspension controller according to claim 1, wherein the control means controls the allotment ratio so that the sensed turning condition approaches a target condition.

4. The suspension controller according to claim 1, wherein the sensing means senses, besides the steering angle, a vehicle speed and a yaw rate of the body, and the control means controls the allotment ratio so that the sensed yaw rate approaches a target yaw rate which is calculated from the sensed steering angle and the sensed vehicle speed.

5. The suspension controller according to claim 1, wherein the sensing means senses, besides the steering angle, a vehicle speed and a yaw rate of the body, and the control means controls the allotment ratio during turning on the basis of a criterion value, the criterion value being a product of the sensed yaw rate and an error of the sensed yaw rate from a target yaw rate which is calculated from the sensed steering angle and the sensed vehicle speed.

6. The suspension controller according to claim 1, wherein the sensing means senses, besides the steering angle, a vehicle speed, a yaw rate and a lateral acceleration of the body, and the control means controls the allotment ratio during turning on the basis of a criterion value, the criterion value being a product of the sensed lateral acceleration and an error of the sensed yaw rate from a target yaw rate which is calculated from the sensed steering angle and the sensed vehicle speed.

7. The suspension controller according to claim 1, wherein the sensing means senses, besides the steering angle, a vehicle speed and a yaw rate of the body, and the control means controls the allotment ratio during turning on the basis of a criterion value, the criterion value being a product of the sensed yaw rate and an error of the sensed yaw rate from a target yaw rate which is calculated from an understeer setting coefficient derived from the sensed steering angle, the sensed vehicle speed, a square of the sensed vehicle speed and characteristics of the vehicle.

8. the suspension controller according to claim 4, wherein the target yaw rate is determined at a preset limit yaw rate which is derived from the sensed vehicle speed and a preset tolerable lateral acceleration in turning, when the calculated target yaw rate is greater than the preset limit yaw rate.

9. The suspension controller according to claim 5, wherein the target yaw rate is determined at a preset limit yaw rate which is derived from the sensed vehicle speed and a preset tolerable lateral acceleration in turning, when the calculated target yaw rate is greater than the preset limit yaw rate.

10. The suspension controller according to claim 6, wherein the target yaw rate is determined at a preset limit yaw rate which is derived from the sensed vehicle speed and a preset tolerable lateral acceleration in turning, when the calculated target yaw rate is greater than the preset limit yaw rate.

11. The suspension controller according to claim 7, wherein the target yaw rate is determined at a preset limit yaw rate which is derived from the sensed vehicle speed and a preset tolerable lateral acceleration in turning, when the calculated target yaw rate is greater than the preset limit yaw rate.

12. The suspension controller according to claim 1, wherein the control means control the allotment ratio during turning on the basis of a load distribution of the vehicle, the load distribution being determined when the vehicle is not turning.

13. The suspension controller according to claim 12, wherein the rear axle is allotted a larger load shift when the load distribution at the front axle is determined to be greater than at the rear axle, while the front axle is allotted with a larger load shift when the load distribution at the rear axle is determined to be greater than at the front axle.

14. The suspension controller according to claim 1, wherein the sensing means senses, besides the steering angle, a longitudinal acceleration of the body, and the control means controls the allotment ratio during turning on the basis of the sensed longitudinal acceleration.

15. The suspension controller according to claim 14, wherein the front axle is allotted a larger load shift when the sensed longitudinal acceleration is negative, while the rear axle is allotted with a larger load shift when the sensed longitudinal acceleration is positive.

* * * * *